US012140438B2

United States Patent
Tian et al.

(10) Patent No.: US 12,140,438 B2
(45) Date of Patent: *Nov. 12, 2024

(54) MULTI-MODAL TRANSPORTATION SERVICE PLANNING AND FULFILLMENT

(71) Applicant: Joby Aero, Inc., Santa Cruz, CA (US)

(72) Inventors: Kevin Tian, San Francisco, CA (US); Adam Warmoth, San Francisco, CA (US); Raphael Max Lurie, San Francisco, CA (US); Hasrat Godil, Millbrae, CA (US); Nikhil Goel, San Francisco, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/163,626

(22) Filed: Feb. 2, 2023

(65) Prior Publication Data

US 2023/0375348 A1 Nov. 23, 2023

Related U.S. Application Data

(63) Continuation of application No. 17/092,805, filed on Nov. 9, 2020, now abandoned, which is a
(Continued)

(51) Int. Cl.
*H04L 29/06* (2006.01)
*G01C 21/34* (2006.01)
(Continued)

(52) U.S. Cl.
CPC ....... *G01C 21/3423* (2013.01); *G01C 21/343* (2013.01); *G01C 21/3438* (2013.01);
(Continued)

(58) Field of Classification Search
CPC ......... G06F 21/44; G06F 21/31; H04L 63/08; H04L 63/10; H04L 63/105; H04L 63/205; H04L 63/0876; H04L 2463/082
See application file for complete search history.

(56) References Cited

U.S. PATENT DOCUMENTS 3,035,789 A 5/1962 Young
4,022,405 A 5/1977 Peterson
(Continued)

FOREIGN PATENT DOCUMENTS

CN 106096749 A 11/2016
CN 107810386 A 3/2018
(Continued)

OTHER PUBLICATIONS

Bailey et al., "An Assessment of Related Crew and Single Pilot Operations in Commercial Transport Aircraft Operations", 2017 IEEE/AIAA 36th Digital Avionics Systems Conference (DASC), Date of Conference: Sep. 17-21, 2017.*
(Continued)

*Primary Examiner* — Morshed Mehedi
(74) *Attorney, Agent, or Firm* — Dority & Manning, P.A.

(57) ABSTRACT

The present disclosure provides systems and methods for real-time planning and fulfillment of multi-modal transportation services in a multi-modal ride sharing network. In particular, aspects of the present disclosure are directed to a computing system that creates an end-to-end multi-modal itinerary responsive to a user request for transportation service between an origin and a destination. The multi-modal itinerary can include two or more transportation legs that include travel via two or more different transportation modalities such as, as examples, via a car and via an aircraft.

20 Claims, 10 Drawing Sheets

Related U.S. Application Data continuation of application No. 16/786,319, filed on Feb. 10, 2020, now Pat. No. 10,837,786.

(60) Provisional application No. 62/820,011, filed on Mar. 18, 2019.

(51) Int. Cl.
*G01C 21/36* (2006.01)
*G06F 21/44* (2013.01)
*G06Q 10/02* (2012.01)
*G06Q 50/40* (2024.01)
*H04L 9/40* (2022.01)
*G06F 21/31* (2013.01)

(52) U.S. Cl.
CPC ..... *G01C 21/3453* (2013.01); *G01C 21/3691* (2013.01); *G06F 21/44* (2013.01); *G06Q 10/02* (2013.01); *G06Q 50/40* (2024.01); *H04L 63/08* (2013.01); *H04L 63/10* (2013.01); *H04L 63/105* (2013.01); *H04L 63/205* (2013.01); *G06F 21/31* (2013.01); *H04L 63/0876* (2013.01); *H04L 2463/082* (2013.01)

(56) References Cited

U.S. PATENT DOCUMENTS

| | | | |
|---|---|---|---|
| 5,823,468 A | 10/1998 | Bothe | |
| 5,839,691 A | 11/1998 | Lariviere | |
| 5,842,667 A | 12/1998 | Jones | |
| 6,343,127 B1 | 1/2002 | Billoud | |
| 6,892,980 B2 | 5/2005 | Kawai | |
| 8,016,226 B1 | 9/2011 | Wood | |
| 8,020,804 B2 | 9/2011 | Yoeli | |
| 8,311,686 B2 | 11/2012 | Herkes et al. | |
| 8,733,690 B2 | 5/2014 | Bevirt et al. | |
| 8,737,634 B2 | 5/2014 | Brown et al. | |
| 8,849,479 B2 | 9/2014 | Walter | |
| 9,205,930 B2 | 12/2015 | Yanagawa | |
| 9,387,928 B1 | 7/2016 | Gentry et al. | |
| 9,415,870 B1 | 8/2016 | Beckman et al. | |
| 9,422,055 B1 | 8/2016 | Beckman et al. | |
| 9,435,661 B2 | 9/2016 | Brenner et al. | |
| 9,442,496 B1 | 9/2016 | Beckman et al. | |
| 9,550,561 B1 | 1/2017 | Beckman et al. | |
| 9,561,860 B2* | 2/2017 | Knapp | B64C 11/44 |
| 9,663,237 B2 | 5/2017 | Senkel et al. | |
| 9,694,911 B2 | 7/2017 | Bevirt et al. | |
| 9,697,737 B2* | 7/2017 | Hale | G08G 5/0021 |
| 9,771,157 B2 | 9/2017 | Gagne et al. | |
| 9,786,961 B2 | 10/2017 | Dyer et al. | |
| 9,802,702 B1 | 10/2017 | Beckman et al. | |
| 9,813,510 B1 | 11/2017 | Nickels et al. | |
| 9,816,529 B2 | 11/2017 | Grissom et al. | |
| 9,817,400 B1 | 11/2017 | Poeppel et al. | |
| 9,838,436 B2 | 12/2017 | Michaels | |
| 9,857,190 B2 | 1/2018 | Marueli et al. | |
| 10,140,873 B2 | 11/2018 | Adler et al. | |
| 10,144,504 B1 | 12/2018 | Selwa et al. | |
| 10,152,894 B2 | 12/2018 | Adler et al. | |
| 10,180,331 B2 | 1/2019 | Hajj et al. | |
| 10,216,190 B2 | 2/2019 | Bostick et al. | |
| 10,217,069 B2 | 2/2019 | Scicluna et al. | |
| 10,249,200 B1 | 4/2019 | Grenier et al. | |
| 10,304,344 B2 | 5/2019 | Moravek et al. | |
| 10,330,482 B2 | 6/2019 | Chen et al. | |
| 10,593,215 B2 | 3/2020 | Villa | |
| 10,593,217 B2 | 3/2020 | Shannon | |
| 10,752,365 B2 | 8/2020 | Galzin | |
| 10,759,537 B2 | 9/2020 | Moore et al. | |
| 10,768,201 B2 | 9/2020 | Luo et al. | |
| 10,832,581 B2 | 11/2020 | Westervelt et al. | |
| 10,836,470 B2 | 11/2020 | Liu et al. | |
| 10,913,528 B1 | 2/2021 | Moore et al. | |
| 10,948,910 B2 | 3/2021 | Taveira et al. | |
| 10,960,785 B2 | 3/2021 | Villanueva et al. | |
| 11,130,566 B2 | 9/2021 | Mikic et al. | |
| 11,145,211 B2 | 10/2021 | Goel et al. | |
| 11,238,745 B2 | 2/2022 | Villa et al. | |
| 11,295,622 B2 | 4/2022 | Goel et al. | |
| 2004/0078210 A1 | 4/2004 | Segelbaum | |
| 2009/0119135 A1* | 5/2009 | Schoeman | G06Q 50/40 705/5 |
| 2010/0079342 A1 | 4/2010 | Smith et al. | |
| 2012/0239452 A1 | 9/2012 | Trivedi et al. | |
| 2014/0173511 A1 | 6/2014 | Lehmann et al. | |
| 2014/0179535 A1 | 6/2014 | Stückl et al. | |
| 2014/0207375 A1 | 7/2014 | Lerenc | |
| 2015/0371204 A1 | 12/2015 | Balda et al. | |
| 2016/0132792 A1 | 5/2016 | Rosnow | |
| 2016/0231129 A1* | 8/2016 | Erez | G01C 21/3423 |
| 2016/0232489 A1* | 8/2016 | Skaaksrud | G06Q 10/0836 |
| 2016/0311529 A1 | 10/2016 | Brotherton-Ratcliffe et al. | |
| 2016/0364679 A1 | 12/2016 | Cao | |
| 2016/0364823 A1 | 12/2016 | Cao | |
| 2017/0053209 A1 | 2/2017 | Céret et al. | |
| 2017/0197710 A1 | 7/2017 | Ma | |
| 2017/0357914 A1 | 12/2017 | Tulabandhula et al. | |
| 2018/0018887 A1 | 1/2018 | Sharma et al. | |
| 2018/0053425 A1 | 2/2018 | Adler et al. | |
| 2018/0134400 A1* | 5/2018 | Knapp | G01C 21/20 |
| 2018/0216988 A1 | 8/2018 | Nance | |
| 2018/0295228 A1* | 10/2018 | Hardee | H04W 4/021 |
| 2018/0308366 A1 | 10/2018 | Goel et al. | |
| 2018/0354636 A1 | 12/2018 | Darnell et al. | |
| 2019/0034838 A1* | 1/2019 | Canis | G06F 16/24578 |
| 2019/0146508 A1 | 5/2019 | Dean et al. | |
| 2019/0212157 A1 | 7/2019 | Wu et al. | |
| 2019/0221127 A1 | 7/2019 | Shannon | |
| 2019/0316849 A1 | 10/2019 | Abrego et al. | |
| 2019/0322368 A1* | 10/2019 | Melcher | B64U 30/12 |
| 2019/0325757 A1* | 10/2019 | Goel | G05D 1/102 |
| 2019/0340933 A1* | 11/2019 | Villa | G06Q 10/047 |
| 2020/0103922 A1 | 4/2020 | Nonami et al. | |
| 2020/0182637 A1 | 6/2020 | Kumar et al. | |
| 2020/0294405 A1* | 9/2020 | Foltan | G08G 5/0073 |
| 2020/0388166 A1 | 12/2020 | Rostamzadeh et al. | |

FOREIGN PATENT DOCUMENTS

| | | |
|---|---|---|
| CN | 108734429 A | 11/2018 |
| CN | 109074622 A | 12/2018 |
| EP | 0945841 A1 | 9/1999 |
| EP | 2698749 A1 | 2/2014 |
| EP | 3499634 A1 | 6/2019 |
| JP | H11232355 | 8/1999 |
| JP | 2000048032 A | 2/2000 |
| JP | 2005182146 A | 7/2005 |
| JP | 2008210278 A | 9/2008 |
| JP | 2009002683 A | 1/2009 |
| JP | 2010095246 A | 4/2010 |
| JP | 2013086795 A | 5/2013 |
| JP | 2016139263 A | 8/2016 |
| JP | 2016177396 A | 10/2016 |
| JP | 2017041240 A | 2/2017 |
| JP | 2018205191 A | 12/2018 |
| WO | WO 2018023556 A1 | 2/2018 |
| WO | WO 2019089677 A1 | 5/2019 |
| WO | WO 2020252024 A1 | 12/2020 |

OTHER PUBLICATIONS

International Search Report and Written Opinion for PCT/US2020/023313, mailed on Jun. 4, 2020, 12 pages.

Roy et al., "A study on the impact of aircraft technology on the future of regional transportation using small aircraft", 2018 Aviation Technology, Integration, and Operations Conference, Jun. 25-29, 2018, Atlanta, Georgia, 18 pages.

Glaab et al., "Simulating Fleet Noise for Notional UAM Vehicles and Operations in New York", 2019 IEEE/AIAA 38th Digital Avionics Systems Conference, Sep. 8-12, 2019, San Diego, California, pp. 1-10.

(56) References Cited

OTHER PUBLICATIONS

Bennaceur et al., "Passenger-centric urban air mobility: Fairness trade-offs and operational efficiency", Transportation Research: Emerging Technologies, 2021, 29 pages.
Jong, "Optimizing cost effectiveness and flexibility of air taxis: A case study for optimization of air taxi operations", University of Twente, Master's thesis, 2007, 62 pages.
Miao et al., "Data-driven robust taxi dispatch under demand uncertainties", IEEE Transactions on Control Systems Technology 27, No. 1, 2017, 16 pages.
Miao et al., "Taxi dispatch with real-time sensing data in metropolitan areas: A receding horizon control approach", In Proceedings of the ACM/IEEE Sixth International Conference on Cyber-Physical Systems, 2015, 15 pages.
Uber, "Fast-forwarding to a future of on-demand urban air transportation", 2016, 99 pages.

\* cited by examiner

MULTI-MODAL TRANSPORTATION SERVICE PLANNING AND FULFILLMENT

PRIORITY CLAIM

The present application is a continuation of U.S. application Ser. No. 17/092,805 having a filing date of Nov. 9, 2020, which is a continuation of Ser. No. 16/786,319 having a filing date of Feb. 10, 2020 and issued as U.S. Pat. No. 10,837,786 on Nov. 17, 2020. U.S. application Ser. No. 16/786,319 claims priority to and the benefit of U.S. Provisional Patent Application No. 62/820,011, filed Mar. 18, 2019. Applicant claims priority to and the benefit of each of such applications and incorporates all such applications herein by reference in its entirety.

FIELD

The present disclosure relates generally to facilitating multi-modal transportation services for riders. More particularly, the present disclosure relates to systems and methods for real-time planning and fulfillment of multi-modal transportation services via a multi-modal ride sharing network.

BACKGROUND

Transportation services applications exist which enable individual users to request transportation on demand. For example, transportation services currently exist which enable drivers of ground-based vehicle (e.g., "cars") to provide transportation services for potential passengers, as well as to deliver packages, goods, and/or prepared foods. In addition, users of the transportation applications may be able to book transit tickets or drive themselves using an electric bike or scooter.

However, certain current services are limited to a single transportation modality, namely transportation via cars, bikes, or scooters. As urban areas become increasingly dense, ground infrastructure such as roadways will become increasingly constrained and congested and, as a result, ground-based transportation may not suitably serve the transportation needs of a significant number of users.

SUMMARY

Aspects and advantages of embodiments of the present disclosure will be set forth in part in the following description, or can be learned from the description, or can be learned through practice of the embodiments.

One example aspect of the present disclosure is directed to a computing system configured to plan and fulfill multi-modal transportation service itineraries. The computing system includes one or more processors and one or more non-transitory computer-readable media that collectively store instructions that, when executed by the one or more processors, cause the computing system to perform operations. The operations include receiving a request from a user that requests transportation from an origin to a destination. The operations include generating an end-to-end itinerary comprising a plurality of transportation legs that include transportation via a plurality of different transportation modalities. The operations include matching, through interaction with one or more ride sharing networks, the user with a plurality of different service providers that provide transportation via the plurality of different transportation modalities.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
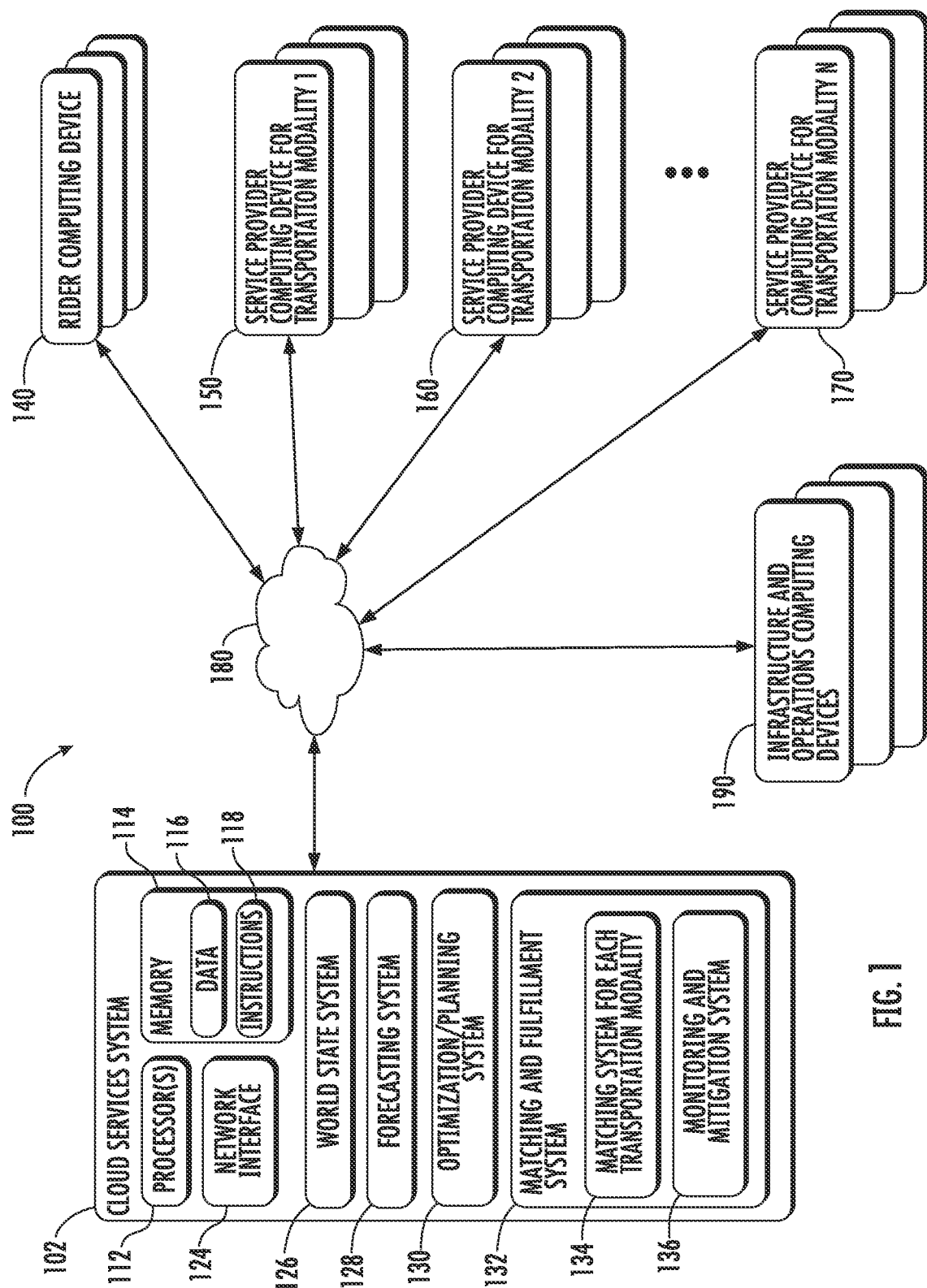
FIG. 1 depicts a block diagram of an example computing system according to example embodiments of the present disclosure.

Example aspects of the present disclosure are directed to systems and methods for real-time planning and fulfillment of multi-modal transportation services in a multi-modal ride sharing network. In particular, aspects of the present disclosure are directed to a computing system that creates an end-to-end multi-modal itinerary responsive to a user request for transportation service between an origin and a destination. The multi-modal itinerary can include two or more transportation legs that include travel via two or more different transportation modalities such as, as examples, via a car and via an aircraft. The computing system can fulfill the itinerary for a user by, for example, matching the user with different service providers to complete each transportation leg via its associated modality. The computing system can monitor progress of the user along the itinerary in real-time and can dynamically mitigate delays or other complications in one of the transportation legs by determining and fulfilling an alternative itinerary. For example, the computing system can dynamically match the user with service providers (e.g., to receive pooled transportation) while the user progresses along earlier legs of the itinerary. In some instances, the computing system may have direct control over transportation services provided by the service providers on at least some of the transportation modalities and, therefore, may dynamically optimize planned transportation services by the service providers to account for real-time changes in rider availability and demand. In other instances, the computing system can match the user with a service provider from a free-floating, dynamic pool of transportation service providers. Thus, the systems and methods of the present disclosure can stitch together multiple transportation legs that use different transportation modalities to generate an end-to-end itinerary and can monitor user progress along the transportation legs to handle and mitigate delays and other deviations from the planned itinerary in real-time.

More particularly, a computing system can receive a request from a user that requests for the computing system to facilitate transportation service for the user from an origin to a destination. For example, the user can interact with a dedicated application on the user's computing device (e.g., smartphone, tablet, wearable computing device, or the like) to initiate the request. In some instances, unless specified otherwise, the origin of the transportation service can be assumed to be a current location of the user (e.g., as indicated by location data such as GPS data received from the user's computing device and/or as input by the user). The user can also supply a desired destination (e.g., by typing the destination into a text field which may, for example, provide suggested completed entries while the user types).

In some implementations, the request can also specify an "arrive by" date and time at which the user desires to arrive at the requested destination. Thus, the user can specify exactly when the user would like to arrive at the destination. In other implementations, the request can indicate a "depart at" date and time that the user would like to depart. In some examples, the "depart at" date and time can be assumed to be the current date and time unless specified otherwise.

In some implementations, the user can also provide entries for any number of additional characteristics that the user would like the transportation service to meet. For example, additional entries can specify a required number of seats, a preferred vehicle type (e.g., luxury vs. economy, humanly-operated vs. autonomous, etc.), an available weight capacity such as the ability to accommodate the weight of any luggage carried by the user, maximum price, and/or various other characteristics.

In response to the request, the computing system can generate at least one itinerary that includes transportation of the user from the origin to the destination. Specifically, the computing system can create an end-to-end multi-modal itinerary that includes two or more transportation legs that include travel via two or more different transportation modalities such as, for example: cars, motorcycles, light electric vehicles (e.g., electric bicycles or scooters), buses, trains, aircraft (e.g., airplanes), watercraft, walking, and/or other transportation modalities. Example aircrafts can also include helicopters and other vertical take-off and landing aircraft (VTOL) such as electric vertical take-off and landing aircraft (eVTOL). The vehicles can include non-autonomous, semi-autonomous, and/or fully-autonomous vehicles.

In some implementations, the computing system can facilitate the ability of the user to receive transportation on one or more of the transportation legs included in the itinerary. As one example, the computing system can interact with one or more ride-sharing networks to match the user with one or more transportation service providers. As another example, the computing system can book or otherwise reserve a seat in, space on, or usage of one or more of the transportation modalities for the user. Additionally or alternatively, the computing system can simply provide information for options to be provided by one or more third parties for one or more of the transportation legs.

More particularly, in some implementations, the computing system can respond to the user's request by determining whether it is better to fulfill the user's request using a single transportation modality or using multiple transportation modalities. As one example, the computing system can evaluate the user's current location, request origin, and/or destination to determine which modalities of transportation are usable at such location (e.g., able to access such locations). For example, the location(s) can be checked against a list of white listed locations that have been approved for participation in various types of modalities (e.g., flight modalities for the purpose of generating a multi-modal trip itinerary). As another example, the computing system can evaluate (e.g., generate) one or more itineraries that are single-modal and one or more itineraries that a multi-modal (e.g., inclusive of various combinations of different transportation modalities). The computing system can compare the generated single- and multi-modal itineraries to determine whether it is appropriate to suggest a single- or multi-modal itinerary to the user. For example, one or more of the best itineraries (e.g., as evaluated based on various characteristics such as cost, time, etc.) can be suggested to the user. The user can select one of the suggested itineraries to receive transportation services in accordance with the selected itinerary.

In addition, in some implementations, the computing system can continually re-evaluate various itineraries (e.g., single- and/or multi-modal itineraries) before and even during completion of a selected itinerary. If an improved itinerary becomes available (e.g., which may include changing from a single-modal itinerary to a multi-modal itinerary if, for example, a seat on a flight becomes available) the computing system can suggest the improved itinerary for selection by the user. In some implementations, if the user selects the improved itinerary during completion of an existing itinerary, the computing system can facilitate switching to the updated itinerary, including, for example, re-routing a transportation provider that is currently transporting the user to an alternative, updated destination.

Thus, in response to the user's request, the computing system can perform one or more algorithms to generate an itinerary for the user. As an example, in some implementations, the computing system can sequentially analyze and identify potential transportation legs for each different available transportation modality. For example, a most critical, challenging, and/or supply-constrained transportation leg can be identified first and then the remainder of the itinerary can be stitched around such leg. In some implementations, the order of analysis for the different modalities can be a function of a total distance associated with the transportation service (e.g., shorter transportation services result in ground-based modalities being assessed first while longer transportation services result in flight-based modalities being assessed first).

As one particular example, in some implementations, the computing system can initially analyze a first transportation modality that is the most efficient (e.g., in terms of travel speed and/or cost) transportation modality which operates according to a fixed infrastructure. As an example, for most longer transportation services and for the mix of different modalities described above, flight modalities will often both be the most efficient transportation modality (e.g., in terms travel speed/time) while also operating according to a fixed infrastructure. By first analyzing the most efficient transportation modality which operates according to a fixed infrastructure, the computing system can seek to identify an important transportation leg around which the remainder of the itinerary can be stitched.

More particularly, in some implementations, one or more of the transportation modalities can operate according to or within a fixed transportation infrastructure in which the ability of passengers to embark and disembark vehicles is constrained to a defined set of transportation nodes. As one example, in some implementations, aircraft that operate within the ride sharing network can be constrained to load and unload passengers only at a defined set of physical take-off and/or landing areas which may in some instances be referred to as skyports. To provide an example, a large urban area may have dozens of transportation nodes located at various locations within the urban area. Each transportation node can include one or more landing pads and/or other infrastructure to enable passengers to safely embark or disembark from aircraft. Transportation nodes can also include charging equipment, re-fueling equipment, and/or other infrastructure for enabling aircraft operation. The take-off and/or landing areas of the transportation nodes can be located at ground level and/or elevated from ground-level (e.g., atop a building).

Alternatively or additionally to a focus on fixed infrastructure, the computing system can initially analyze the transportation modality that is the most supply-constrained. More particularly, certain transportation modalities may be more supply-constrained than other modalities in terms of number of available service providers and/or average number of services provided daily. For example, at least in the near future and due to the relatively larger challenge and cost involved with operating an aircraft, flight modalities are likely to be more supply-constrained than ground-based modalities such as cars. Because the most supply-constrained modality represents the most option-limiting aspect of building different itineraries, by first analyzing the most supply-constrained modality the computing system can more efficiently generate the itinerary.

Often, however, the use of fixed infrastructure will constrain the number and availability of service providers. As such, in many instances, the most-supply constrained transportation modality also often operates according to a fixed infrastructure.

Thus, the computing system can initially identify any fixed transportation nodes (e.g., skyports) associated with a first transportation modality (e.g., flight modality) that are relevant to the user's request. For example, the computing system can identify any nodes that are within a threshold distance from the origin location as candidate departure nodes. Likewise, the computing system can identify any nodes that are within a threshold distance from the destination location as candidate arrival nodes.

In some instances, the computing system may have at least some control over transportation services provided by service providers on at least some of the transportation modalities and, therefore, may pre-determine a number of planned transportation services by the service providers. For example, in some implementations, the aircraft operators can be controlled by (e.g., contracted with) the operator of the ride sharing network. Thus, the computing system can generate (e.g., on a daily basis) an initial pre-defined set of flight plans for the aircraft assets and can add or remove passengers from each planned flight. In some implementations, the computing system may also dynamically optimize planned transportation services by the service providers to account for real-time changes in rider availability and demand. For example, the computing system can dynamically modify the pre-determined flight plans (e.g., delay a planned flight departure by five minutes and/or change a planned flight to an alternative arrival transportation node).

In scenarios in which the first transportation modality operates according to pre-determined plans, after identifying the relevant fixed transportation nodes, the computing system can access a database of pre-determined transportation plans to identify candidate transportation plans between the relevant nodes. For example, the computing system can identify any transportation plans between one of the candidate departure nodes and one of the candidate arrival nodes which would satisfy the user's request, including, for example, any departure or arrival time requests.

As one example, for a request that specifies an "arrive by" time, the computing system can identify a certain number of candidate transportation plans that would enable the user to arrive at the specified destination at or before the "arrive by" time (or shortly after the "arrive by" time if no better plans are available). Likewise, for a request that specified a "depart at" time, the computing system can identify a certain number of candidate transportation plans that would enable the user to depart at or before the "depart at" time (or shortly after the "depart at" time if no better plans are available). As will be described in more detail elsewhere herein, one aspect of determining whether a particular transportation plan meets these timing characteristics is understanding and computing additional estimated amounts of time associated with a user physically progressing through each transportation node (e.g., skyport) and embarking/disembarking from the vehicle, a user using additional transportation modalities (e.g., car travel) to arrive at or depart from each transportation node, and any uncertainty or average variance associated therewith.

To provide an example, if a user is seeking to arrive at their destination at 8:00 am, the computing system can analyze a set of pre-determined flight plans between the pair of relevant nodes to identify a first pre-determined flight plan between the nodes that is planned to operate from 7:35 am to 7:50 am and a second pre-determined flight plan between the nodes that is planned to operate from 7:45 am to 8:00 am. The computing system can further analyze historical data to understand that it typically takes 5 minutes for passengers to disembark the vehicle (e.g., aircraft) and exit the destination transportation node (e.g., skyport). The computing system can also analyze additional data such as map data to understand that the user's final destination is approximately a 5 minute walk from the transportation node. Therefore, the computing system can select as a candidate flight plan the flight plan that departs the departure node at 7:35 am. The itinerary building process can then be performed around the selected plan(s).

In other instances in which the first transportation modality does not have pre-determined plans but instead operates in an "on-demand" nature, the computing system can match the user with a service provider for the first transportation modality from a free-floating, dynamic pool of independent transportation service providers. For example, service providers can dynamically opt in and out of the network and the computing system can operate to match the passenger with a service provider who is currently opted into the network. The service provider can choose to provide the service to the passenger or decline to provide the service. The matched service provider can pick up and drop off the user at the fixed transportation nodes. For example, for flight modalities, the computing system can match the user to one of a dynamically changing pool of aircraft operators and the aircraft operator can choose to provide or decline the proposed flight service.

In some implementations, at any instance in which the computing system operates to match the user with a service provider, the computing system can seek to do so in a pooling fashion in which multiple users are matched with a single service provider. For example, matching in a pooling fashion can include holding matching operations for a delay period in which multiple requests for matching can be collected across the network and then collectively analyzed to identify opportunities for passengers to be pooled with a single service provider. Alternatively or additionally, passengers can be dynamically added or removed from an existing pool matched with a service provider. Pooling analysis can be performed at the time of request and/or transportation service fulfillment.

In scenarios in which service providers in the first transportation modality are free-floating and transportation is "on-demand", the computing system can generate one or more placeholder transportation plans for the first transportation modality between one of the candidate departure nodes and one of the candidate arrival nodes. Each placeholder plan can mimic and be based on historical observations of travel times between the candidate departure node and the candidate arrival node according to the first transportation modality. Thus, the placeholder plan may serve as an estimation (e.g., in terms of travel time, etc.) of the transportation service that will be available at a future time for which the user is seeking to travel according to the first transportation modality.

To provide an example, if a user is seeking to arrive at their destination at 8:00 am, the computing system can analyze historical data associated with travel between a pair of relevant nodes to understand that transportation services between the pair of relevant nodes between 7:30 and 8:00 am often take around 15 minutes. The computing system can further analyze historical to understand that it typically takes 5 minutes for passengers to disembark the vehicle (e.g., aircraft) and exit the transportation node (e.g., skyport). The computing system can analyze additional data such as map data to understand that the user's destination is approximately a 5 minute walk from the transportation node. Therefore, the computing system can generate a placeholder plan that includes the user departing a departure node at 7:35 am and arriving at an arrival node at 7:50 am. The placeholder plan(s) can serve as candidate transportation plans for the itinerary building process.

Thus, through analysis of a pre-determined set of available transportation plans and/or generation of one or more placeholder plans associated with the relevant transportation nodes, the computing system can identify a set of candidate transportation plans that can form the basis for building a set of potential itineraries. In particular, the computing system can stitch additional transportation legs to each respective candidate transportation plan to generate an end-to-end itinerary.

In some implementations, the computing system can filter the candidate transportation plans using one or more filters. As one example, the computing system may apply a filter that removes any candidate transportation plans that do not have a sufficient number of available seats to match the number of seats requested by the user. As another example, the computing system may apply a filter that removes any candidate transportation plans that employ vehicles that do not meet the vehicle attributes requested by the user (e.g., luxury vehicle versus economy vehicle). As yet another example, a simple filter may ensure that the user is not already booked on the candidate transportation plan.

The computing system can enrich each candidate transportation plan with dynamic information associated with other transportation modalities that will be used to facilitate the candidate transportation plan for the user. For example, the dynamic information can include information descriptive of the expected duration of any transportation legs (e.g., ground-based legs such as car transportation) which would need to be performed to transport the passenger from the origin to the corresponding candidate departure node and from the candidate arrival node to the destination.

In some implementations, the information descriptive of the expected duration of any additional transportation legs (e.g., ground-based legs such as car transportation) which would need to be performed can be determined based historical data and/or real-time data. As one example, if a candidate transportation plan includes a user departing a departure transportation node at 7:35 am, the computing system can analyze historical operations data to determine that, between 7 am and 8 am, it typically takes passengers 15 minutes to physically pass through such departure transportation node, including, for example, participation in any required security checks, luggage handling, safety briefings, and boarding of the aircraft. Furthermore, the computing system can analyze historical data associated with historical use of ground-based ride sharing network to provide transportation service from the user's origin to the departure transportation node to determine that transportation via a car is estimated to take 10 minutes. This (and other) information can be appended or "stitched" to the candidate transportation plan to generate a candidate itinerary.

More particularly, in some instances, enriching each candidate transportation plan with dynamic information can include or be referred to as stitching the additional transportation leg information to the candidate transportation plan to generate an itinerary, where an itinerary refers to a complete end-to-end and multi-modal transportation service from the origin to the destination that includes two or more transportation legs. Thus, adding the additional transportation leg information to each candidate transportation plan can result in the generation of a number of candidate itineraries.

The computing system can select one or more of the "best" itineraries to provide for display to the user. As one example, to determine which itineraries are the "best", the computing system can score each itinerary using an objective function that balances various factors such as: total travel time; cumulative cost to the service providers to provide the various legs of the itinerary; price to the user to have the service provided; deviation of estimated arrival time from the requested arrival time; deviation of the estimated departure time from the requested departure time; satisfaction of desired vehicle characteristics; number and/or quality of contingency plans; and/or various other measures of itinerary quality.

More particularly, in some implementations, the computing system can assess the number and/or quality of contingency plans associated with a given itinerary. For example, contingency plans can include alternative transportation legs that, should a particular transportation leg of an itinerary fail to be successfully completed as planned, the user can alternatively use to arrive at their destination. In some implementations, to understand the number and/or quality of contingency plans associated with a given itinerary, the computing system can determine, for each candidate transportation leg different included in the candidate itinerary, the number and/or quality of alternative, contingency transportation legs available between a first location and a second location associated with the candidate transportation leg.

To provide an example, a first candidate itinerary may include a planned flight between Transportation Node A and Transportation Node B at 7:30 am while a second candidate itinerary may include a planned flight between Transportation Node C and Transportation Node B at 7:32 am. While Transportation Node C may be slightly closer to the user's origin than Transportation Node A and therefore enable the user to save 4 minutes total, there may be significantly more planned flights between Transportation Node A and Transportation Node B than between Transportation Node C and Transportation Node B. For example, flights may be planned between Transportation Node A and Transportation Node B every 10 minutes between 7:30 am and 8 am (e.g., 7:30, 7:40, 7:50, 8:00) while the next planned flight between Transportation Node C and Transportation Node B after the 7:32 am departure is not planned to depart until 8:15 am. Thus, there are significantly more and higher quality contingency plans associated with the planned flight between Transportation Nodes A and B relative to the planned flight between Transportation Nodes C and B. This information can be included in the assessment of the candidate itineraries. To continue the example, although the itinerary that includes use of Transportation Node C enables the user to save 4 minutes, the itinerary that includes Transportation Node A may, in some instances, be adjudged to be the better itinerary due to the number and quality of contingency plans. This outcome may be particularly true if ground transportation between the user's origin and Transportation Node C has significant variance or is known to experience delays. Thus, uncertainty and/or observed variance regarding the reliability/outcomes of certain legs of an itinerary can also be used as an input to scoring candidate itineraries.

Thus, the computing system can analyze the candidate itineraries to select one or more itineraries that are high quality according to various measures. The computing system can present the one or more itineraries to the user (e.g., via a user interface on the user's computing device), along with additional information such as a single end-to-end price to fulfill the itinerary. For example, the single price can be the sum of the prices for each leg of the itinerary which may each be computed using various techniques, including, for example, fixed pricing and/or dynamic or "surge" pricing. The user can choose to request fulfillment of an itinerary, decline fulfillment (e.g., by taking no action), or can modify one or more characteristics of the request. For example, the user can modify the itinerary by indicating that the user is electing to complete one of the transportation legs by walking (e.g., rather than via a car).

In some implementations, even if the computing system is unable to identify any itineraries that exactly meet all characteristics of the user's request, the computing system can select a "non-conforming" itinerary for presentation to the user (e.g., along with a visual indication of the non-conforming nature of the itinerary).

According to an aspect of the present disclosure, if the user requests fulfillment of the presented itinerary, the computing system can interact with one or more ride sharing networks to enable the user to complete the itinerary. For example, the computing system can interact with a different ride sharing network for each different transportation modality employed by the itinerary to facilitate matching of the user with a service provider that offers transport using such transportation modality. The ride sharing networks can be run by or otherwise associated with the same and/or different entities. In some implementations, the matching can occur in real-time as the user progresses along the legs of the itinerary. A service provider can include a human operator (e.g., driver or pilot) and/or a vehicle. For example, for certain transportation modalities the user can be matched with a human operator (e.g., car driver) while for other modalities the user can be matched with a vehicle (e.g., aircraft).

As one example, in instances in which the first transportation modality operates according to a pre-determined set of transportation plans, in response to the user requesting fulfillment of an itinerary, the computing system can immediately add the user (and any other requested seats) to the transportation plan of the first modality that is included in the itinerary. Thus, the user can be added to the pre-determined transportation plan as soon as fulfillment is requested, regardless of how far in advance the transportation plan is planned to occur. As another example, in instances in which the first transportation modality operates in an on-demand fashion, the computing system can wait until around the time the on-demand service is needed to initiate the matching process. In either case, if the itinerary includes additional legs such as, for example, ground-based legs which use on-demand matching services, the computing system can wait until around the time the on-demand service will be needed to initiate the matching process.

More particularly, for each transportation leg included in the selected itinerary for which on-demand ride sharing matching is to be performed, the computing system can independently assess (and continually re-assess during transportation service fulfillment) an appropriate matching process initiation time for such transportation leg. The matching process initiation time for each leg can be sufficiently in advance of a planned departure time for such leg so as to successfully match the user with a service provider for such leg to complete the leg in a timely fashion. For example, the matching process initiation time for a given transportation leg can be based on historical and/or real-time data associated with such transportation leg. As examples, the historical data can indicate (e.g., for a relevant time period and/or day of the week) a number of service providers typically available at the departure/pick-up location, an average response time and/or conversion ratio for service providers at the departure/pick-up location, an average travel time associated with the transportation leg, an average variance between actual times of arrival and estimated times of arrival associated with the transportation leg, historical supply and/or demand characteristics, and/or other historical measures of outcomes with performing matching for the transportation leg. The real-time data can indicate a number and respective location of service providers currently available at the departure/pick-up location, an estimated response time and/or conversion ratio for the currently available service providers, real-time weather information, real-time traffic information, real-time estimates or forecasts of supply and/or demand characteristics, and/or other real-time information that assists the system in determining a likely amount of time in advance of the planned departure time for the transportation leg that the system will need to begin the matching process in order to secure matching of the user with a service provider capable of successfully completing the transportation leg. In other implementations, the matching process can begin a fixed amount of time ahead of the planned departure along such leg. For example, the fixed amount of time can be approximately 30 minutes.

In some implementations, the computing system can include and implement logic for handling transportation service provider cancellations and/or inappropriate usage (e.g., "gaming") of the ride sharing network by the transportation service provider. As one example, in the event of a service provider cancellation or if the service provider is not making substantial progress toward fulfilling the requested, the computing system can automatically prompt a re-handling of the rider's request (e.g., re-match to a different service provider but using the same itinerary). Alternatively or additionally, the computing system can automatically create a new request and perform the itinerary creation process an additional time (e.g., in the case that leg(s) of the original itinerary are accepted by a matched service provider by not fulfilled).

In addition or alternatively to service provider cancellations, the computing system can include and implement logic for handling user cancellations. As one example, if the user cancels the transportation request/itinerary prior to the scheduled time of pickup and/or actual pickup for the initial transportation leg, the computing system can cancel the entire trip/itinerary. As another example, if a transportation service provider has already been matched for the initial leg, a first cancellation by the user can be treated as a request to re-match the user for the initial transportation leg. A second cancellation by the user can then result in the entire trip/itinerary being cancelled. This logic which interprets the first cancellation as a re-match request avoids cancelling the entire trip when the user is simply cancelling the match with the first service provider because the first service provider is not making substantial progress toward completing the transportation service (e.g., service provider's vehicle is not moving toward the pickup location).

The computing system can perform the matching process for each leg of the itinerary separately and/or based on current information about the user's progress along the itinerary. In some implementations, the computing system can perform the matching process first for a most supply-constrained transportation modality (e.g., flight modality) used by the itinerary. This can ensure that the user is affirmatively matched with a service provider for the most challenging modality to match prior to transporting the user away from their initial origin (e.g., so the user does not get stuck at a transportation node without a flight waiting for them). In other implementations, there is no pre-determined order in which matching is performed but instead is based only on the respective analysis for each different transportation modality of the appropriate matching process initiation time.

In some implementations, the determination of the matching process initiation time for a given transportation leg can also be based on a current status of the user in completion of the itinerary. More particularly, the computing system can constantly monitor the progress of the user along the itinerary (e.g., based, with the user's permission, on location data associated with the user's device and/or location data associated with the corresponding vehicle transporting the user). Thus, if there is a delay in one transportation leg of the itinerary, this delay can be taken into account when initiating and/or performing the matching process for a subsequent transportation leg of the itinerary. For example, the planned departure time each subsequent leg can be shifted back based on the delay. Thus, various historical and real-time data can be used to ensure that the computing system begins and completes the matching process for different transportation legs at the appropriate time(s) to provide seamless and timely multi-modal transportation to the user.

In some implementations, once the matching process for a transportation leg has been initiated, the computing system can continuously monitor the probability that the system will be able to successfully match the user with a service provider that is available to provide the required transportation. In some implementations, the computing system can proceed to attempt to match the user to a service provider at any point where a probability of future match drops below a threshold. For example, in some implementations, the number of available service providers can be used as a proxy for this probability and the computing system can proceed to attempt the matching if the number of available service providers falls below a certain threshold number.

According to another aspect of the present disclosure, in some implementations and scenarios, the computing system can disable the ability of a transportation service provider to contact the user. In particular, one possible scenario is that the user is currently being transported via flight-based transportation. During flight, the user may have been matched with a ground-based transportation provider. The ground-based transportation provider may arrive at the transfer point (e.g., a destination transportation node) in advance of the user's flight and begin contacting the user (e.g., via phone call or text message) asking the user of their location and if the user is ready to engage in the ground-based transportation service. This can be a frustrating or otherwise undesirable experience for the user as the user may feel as though they are delaying the ground-based transportation service provider and/or being rushed by the ground-based transportation service provider but, because they are currently on the flight, the user is unable to take action to reduce the time until the ground-based service can be engaged. Thus, to prevent this scenario, the computing system may disable a ground-based service provider's ability to contact the user if the ground-based service is being provided following a flight-based transportation leg and the flight-based transportation leg has not yet completed. Once the flight-based transportation leg has completed, the service provider may be re-enabled to contact the user. In some implementations, the computing system can provide the user with status updates to keep the user informed despite disabling the service provider's ability to contact the user (e.g., "John has arrived and is ready to take you to your destination"). In some implementations, the computing system can provide the service provider with status updates to keep the service provider informed despite disabling the service provider's ability to contact the user (e.g., "Jane's flight is delayed by 5 minutes" or "Jane's flight will arrive in 7 minutes").

According to another aspect of the present disclosure, the computing system can continuously monitor the success/viability of each transportation leg in an itinerary and can perform real-time mitigation when a particular transportation leg becomes significantly delayed or cancelled/unfulfilled. Typically, the computing system can attempt to delay intervention/mitigation activities until it is believed with significant probability that one or more legs of a user's itinerary will not be able to be successfully completed.

In some implementations, the mitigation process can include and implement logic for responding to cancellations of flights on which a user is booked. As one example, if a planned flight is cancelled and the user has not yet initiated the itinerary or a threshold period before initiation of the itinerary has not yet been reached, then the computing system can cancel the entire trip/itinerary. The user can be notified of the cancellation and given an opportunity to re-submit the request for transportation. However, if the user has already initiated the itinerary or a threshold period before initiation of the itinerary has been entered, the computing system notify the user and offer to re-route (e.g., re-plan the trip with updated information, re-match for the transportation leg with an alternative service provider, and/or change that transportation leg to an alternative transportation modality). In some implementations, the re-routing operations can be given preference or preferential treatment (e.g., the user's use of a luxury modality may be subsidized or reduced-fare).

In some implementations, the mitigation process can include manual inputs by human mitigation personnel. For example, the need to perform mitigation can be automatically detected and, as a result, the computing system can provide an alert and a mitigation user interface to a human mitigation personnel. For example, the mitigation user interface can include a graphical user interface that shows potential alternative transportation legs/itineraries for a user who is currently subject to delay/cancellation. The human personnel can interact with the interface to adjust various parameters of the user's itinerary. For example, the human personnel can change the user to a later transportation plan, delay a not-yet-departed transportation plan (e.g., flight plan) to wait for the delayed user, and/or other actions such as delaying initiation of a matching process for a subsequent transportation leg.

In some implementations, the user interface can provide warnings or other indications of how certain mitigation activities or potential actions might affect other users of the system. For example, if the mitigation personnel attempts to delay a not-yet-departed transportation plan (e.g., flight plan) to wait for the delayed user, the user interface can inform the mitigation personnel that such action would impact 3 other travelers. The warnings/indications provided in the user interface can provide impact information according to various metrics including, for each available choice/action, a number of users that will be impacted as a result of the choice/action, a number of users that will miss their arrive by times as a result of the choice/action, an aggregate number of minutes that will be added to all the users' transportation services as a result of the choice/action, and/or other metrics. Generally, preference can be given to mitigation strategies that have minimal impacts on other users.

In other implementations, the mitigation process can be automated (e.g., with the ability for manual overrides). As an example, the computing system can continuously generate contingency itineraries for each user. For example, the contingency itineraries can be generated using a process as described above but taking into account potential or actual delays in certain transportation legs. When it is detected that mitigation interventions should be performed, the computing system can automatically select the best available contingency itineraries and push the selected itineraries out to each user and other system component. For example, automatic updates and alerts can be sent to passengers, service providers, operations personnel, and/or other integrated systems. The contingency itineraries can be ranked based on various metrics including, for each available choice/action, a number of users that will be impacted as a result of the choice/action, a number of users that will miss their arrive by times as a result of the choice/action, an aggregate number of minutes that will be added to all the users' transportation services as a result of the choice/action, and/or other metrics. In some instances, this dynamic contingency generation can be viewed as a continuous system-wide re-optimization of itineraries based on real-time conditions.

Another example aspect of the present disclosure is directed to the rider experience on multi-modal itineraries. As one example, a user's device can provide a user interface that includes real-time information about different transportation legs included in the itinerary. For example, one example user interface can show information about the current leg of the itinerary in a first (e.g., upper) portion of the interface. Information about the other legs (e.g., subsequent legs) can be shown in a second (e.g., lower) portion of the interface. For example, the information about the subsequent legs can include real-time updates or notifications providing information about an ongoing matching process. For example, while on one leg of the itinerary, the user can receive a notification that the service provider for the next leg of itinerary has been matched, is on their way, arrived at the next pick-up location, etc. This provides the user with an enjoyable concierge service in which the user is confident that the system is actively ensuring that they have transportation for each leg of the itinerary and that such transportation will enable them to arrive at their final destination at the appropriate time.

When the multi-modal itinerary has been completed, the computing system can provide the user with a single receipt. The single receipt can detail respective portions of the final cost associated with each of the multiple legs of transportation. The computing system can generate the single receipt by generating multiple receipts respectively for the multiple transportation legs and then stitching the multiple receipts to generate the single receipt.

Thus, aspects of the present disclosure are directed to systems and methods for real-time planning and fulfillment of multi-modal transportation services in a multi-modal ride sharing network. The systems and methods efficiently interact with various networks of service providers to ensure a seamless and timely multi-modal experience for a rider.

With reference now to the Figures, example embodiments of the present disclosure will be discussed in further detail.

Example Devices and Systems

FIG. 1 depicts a block diagram of an example computing system 100 according to example embodiments of the present disclosure. The computing system 100 includes a cloud services system 102 that can operate to plan and fulfill multi-modal transportation service itineraries.

The cloud services system 102 can be communicatively connected over a network 180 to one or more rider computing devices 140, one or more service provider computing devices 150 for a first transportation modality, one or more service provider computing devices 160 for a second transportation modality, one or more service provider computing devices 170 for an Nth transportation modality, and one or more infrastructure and operations computing devices 190.

Each of the computing devices 140, 150, 160, 170, 190 can include any type of computing device such as a smartphone, tablet, hand-held computing device, wearable computing device, embedded computing device, navigational computing device, vehicle computing device, etc. A computing device can include one or more processors and a memory (e.g., similar to as will be discussed with reference to processors 112 and memory 114). Although service provider devices are shown for N different transportation modalities, any number of different transportation modalities can be used, including, for example, less than the three illustrated modalities (e.g., two modalities can be used).

The cloud services system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. In some implementations, the cloud services system 102 can obtain data from one or more memory device(s) that are remote from the system 102.

The memory 114 can also store computer-readable instructions 118 that can be executed by the one or more processors 112. The instructions 118 can be software written in any suitable programming language or can be implemented in hardware. Additionally or alternatively, the instructions 118 can be executed in logically and/or virtually separate threads on processor(s) 112. For example, the memory 114 can store instructions 118 that when executed by the one or more processors 112 cause the one or more processors 112 to perform any of the operations and/or functions described herein.

In some implementations, the cloud services system 102 can facilitate the ability of the user to receive transportation on one or more of the transportation legs included in an itinerary. As one example, the cloud services system 102 can interact with one or more ride-sharing networks to match the user with one or more transportation service providers 150, 160, 170. As another example, the cloud services system 102 can book or otherwise reserve a seat in, space on, or usage of one or more of the transportation modalities for the user. Additionally or alternatively, the cloud services system 102 can simply provide information for options to be provided by one or more third parties for one or more of the transportation legs.

More particularly, in some implementations, the cloud services system 102 can respond to a user's request by determining whether it is better to fulfill the user's request using a single transportation modality or using multiple transportation modalities. As one example, the cloud services system 102 can evaluate the user's current location, request origin, and/or destination to determine which modalities of transportation are usable at such location (e.g., able to access such locations). For example, the location(s) can be checked against a list of white listed locations that have been approved for participation in various types of modalities (e.g., flight modalities for the purpose of generating a multi-modal trip itinerary). As another example, the cloud services system 102 can evaluate (e.g., generate) one or more itineraries that are single-modal and one or more itineraries that a multi-modal (e.g., inclusive of various combinations of different transportation modalities). The cloud services system 102 can compare the generated single- and multi-modal itineraries to determine whether it is appropriate to suggest a single- or multi-modal itinerary to the user. For example, one or more of the best itineraries (e.g., as evaluated based on various characteristics such as cost, time, etc.) can be suggested to the user. The user can select one of the suggested itineraries to receive transportation services in accordance with the selected itinerary.

In addition, in some implementations, the cloud services system 102 can continually re-evaluate various itineraries (e.g., single- and/or multi-modal itineraries) before and even during completion of a selected itinerary. If an improved itinerary becomes available (e.g., which may include changing from a single-modal itinerary to a multi-modal itinerary if, for example, a seat on a flight becomes available) the cloud services system 102 can suggest the improved itinerary for selection by the user. In some implementations, if the user selects the improved itinerary during completion of an existing itinerary, the cloud services system 102 can facilitate switching to the updated itinerary, including, for example, re-routing a transportation provider that is currently transporting the user to an alternative, updated destination.

In some implementations, the cloud services system 102 can include and implement logic for handling transportation service provider cancellations and/or inappropriate usage (e.g., "gaming") of the ride sharing network by the transportation service provider. As one example, in the event of a service provider cancellation or if the service provider is not making substantial progress toward fulfilling the requested, the cloud services system 102 can automatically prompt a re-handling of the rider's request (e.g., re-match to a different service provider but using the same itinerary). Alternatively or additionally, the cloud services system 102 can automatically create a new request and perform the itinerary creation process an additional time (e.g., in the case that leg(s) of the original itinerary are accepted by a matched service provider by not fulfilled).

In addition or alternatively to service provider cancellations, the cloud services system 102 can include and implement logic for handling user cancellations. As one example, if the user cancels the transportation request/itinerary prior to the scheduled time of pickup and/or actual pickup for the initial transportation leg, the cloud services system 102 can cancel the entire trip/itinerary. As another example, if a transportation service provider has already been matched for the initial leg, a first cancellation by the user can be treated as a request to re-match the user for the initial transportation leg. A second cancellation by the user can then result in the entire trip/itinerary being cancelled. This logic which interprets the first cancellation as a re-match request avoids cancelling the entire trip when the user is simply cancelling the match with the first service provider because the first service provider is not making substantial progress toward completing the transportation service (e.g., service provider's vehicle is not moving toward the pickup location).

According to another aspect of the present disclosure, in some implementations and scenarios, the cloud services system 102 can disable the ability of a transportation service provider to contact the user. In particular, one possible scenario is that the user is currently being transported via flight-based transportation. During flight, the user may have been matched with a ground-based transportation provider. The ground-based transportation provider may arrive at the transfer point (e.g., a destination transportation node) in advance of the user's flight and begin contacting the user (e.g., via phone call or text message) asking the user of their location and if the user is ready to engage in the ground-based transportation service. This can be a frustrating or otherwise undesirable experience for the user as the user may feel as though they are delaying the ground-based transportation service provider and/or being rushed by the ground-based transportation service provider but, because they are currently on the flight, the user is unable to take action to reduce the time until the ground-based service can be engaged. Thus, to prevent this scenario, the cloud services system 102 may disable a ground-based service provider's ability to contact the user if the ground-based service is being provided following a flight-based transportation leg and the flight-based transportation leg has not yet completed. Once the flight-based transportation leg has completed, the service provider may be re-enabled to contact the user. In some implementations, the cloud services system 102 can provide the user with status updates to keep the user informed despite disabling the service provider's ability to contact the user (e.g., "John has arrived and is ready to take you to your destination"). In some implementations, the cloud services system 102 can provide the service provider with status updates to keep the service provider informed despite disabling the service provider's ability to contact the user (e.g., "Jane's flight is delayed by 5 minutes" or "Jane's flight will arrive in 7 minutes").

In some implementations, the cloud services system 102 can perform one or more mitigation processes or routines to mitigate failure of one or legs of transportation in a multi-leg transportation itinerary. As one example, a mitigation process implemented by the cloud services system 102 can include and implement logic for responding to cancellations of flights on which a user is booked. As one example, if a planned flight is cancelled and the user has not yet initiated the itinerary or a threshold period before initiation of the itinerary has not yet been reached, then the cloud services system 102 can cancel the entire trip/itinerary. The user can be notified of the cancellation and given an opportunity to re-submit the request for transportation. However, if the user has already initiated the itinerary or a threshold period before initiation of the itinerary has been entered, the cloud services system 102 notify the user and offer to re-route (e.g., re-plan the trip with updated information, re-match for the transportation leg with an alternative service provider, and/or change that transportation leg to an alternative transportation modality). In some implementations, the re-routing operations can be given preference or preferential treatment (e.g., the user's use of a luxury modality may be subsidized or reduced-fare).

In some implementations, when a multi-modal itinerary has been completed, the cloud services system 102 can provide the user with a single receipt. The single receipt can detail respective portions of the final cost associated with each of the multiple legs of transportation. The cloud services system 102 can generate the single receipt by generating multiple receipts respectively for the multiple transportation legs and then stitching the multiple receipts to generate the single receipt.

The cloud services system 102 can include a number of different systems such as a world state system 126, a forecasting system 128, an optimization/planning system 130, and a matching and fulfillment system 132. The matching and fulfillment system 132 can include a different matching system 134 for each transportation modality and a monitoring and mitigation system 136. Each of the systems 126-136 can be implemented in software, firmware, and/or hardware, including, for example, as software which, when executed by the processors 112 cause the cloud services system 102 to perform desired operations. The systems 126-136 can cooperatively interoperate (e.g., including supplying information to each other).

The world state system 126 can operate to maintain data descriptive of a current state of the world. For example, the world state system 126 can generate, collect, and/or maintain data descriptive of predicted rider demand; predicted service provider supply; predicted weather conditions; planned itineraries; pre-determined transportation plans (e.g., flight plans) and assignments; current requests; current ground transportation service providers; current transportation node operational statuses (e.g., including re-charging or re-fueling capabilities); current aircraft statuses (e.g., including current fuel or battery level); current aircraft pilot statuses; current flight states and trajectories; current airspace information; current weather conditions; current communication system behavior/protocols; and/or the like. The world state system 126 can obtain such world state information through communication with some or all of the devices 140, 150, 160, 170, 190. For example, devices 140 can provide current information about riders while devices 150, 160, and 170 can provide current information about service providers. Devices 190 can provide current information about the status of infrastructure and associated operations/management.

The forecasting system 128 can generated predictions of the demand and supply for transportation services at or between various locations over time. The forecasting system 128 can also generate or supply weather forecasts. The forecasts made by the system 128 can be generated based on historical data and/or through modeling of supply and demand. In some instances, the forecasting system 128 can be referred to as an RMR system, where RMR refers to "routing, matching, and recharging." The RMR system can be able to simulate the behavior of a full day of activity across multiple ride share networks.

The optimization/planning system 130 can generate transportation plans for various transportation assets and/or can generate itineraries for riders. For example, the optimization/planning system 130 can perform flight planning. As another example, optimization/planning system 130 can plan or manage/optimize itineraries which include interactions between riders and service providers across multiple modes of transportation.

The matching and fulfillment system 132 can match a rider with a service provider for each of the different transportation modalities. For example, each respective matching system 134 can communicate with the corresponding service provider computing devices 150, 160, 170 via one or more APIs or connections. Each matching system 134 can communicate trajectories and/or assignments to the corresponding service providers. Thus, the matching and fulfillment system 132 can perform or handle assignment of ground transportation, flight trajectories, take-off/landing, etc.

The monitoring and mitigation system 136 can perform monitoring of user itineraries and can perform mitigation when an itinerary is subject to significant delay (e.g., one of the legs fails to succeed). Thus, the monitoring and mitigation system 136 can perform situation awareness, advisories, adjustments and the like. The monitoring and mitigation system 136 can trigger alerts and actions sent to the devices 140, 150, 160, 170, and 190. For example, riders, service providers, and/or operations personnel can be alerted when a certain transportation plan has been modified and can be provided with an updated plan/course of action. Thus, the monitoring and mitigation system 136 can have additional control over the movement of aircraft, ground vehicles, pilots, and riders.

In some implementations, the cloud services system 102 can also store or include one or more machine-learned models. For example, the models can be or can otherwise include various machine-learned models such as support vector machines, neural networks (e.g., deep neural networks), decision-tree based models (e.g., random forests), or other multi-layer non-linear models. Example neural networks include feed-forward neural networks, recurrent neural networks (e.g., long short-term memory recurrent neural networks), convolutional neural networks, or other forms of neural networks.

In some instances, the service provider computing devices 150, 160, 170 can be associated with autonomous vehicles. Thus, the service provider computing devices 150, 160, 170 can provide communication between the cloud services system 102 and an autonomy stack of the autonomous vehicle which autonomously controls motion of the autonomous vehicle.

The infrastructure and operations computing devices 190 can be any form of computing device used by or at the infrastructure or operations personnel including, for example, devices configured to perform passenger security checks, luggage check in/out, re-charging/re-fueling, safety briefings, vehicle check in/out, and/or the like.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

Example Fixed Infrastructure

Figure 2:
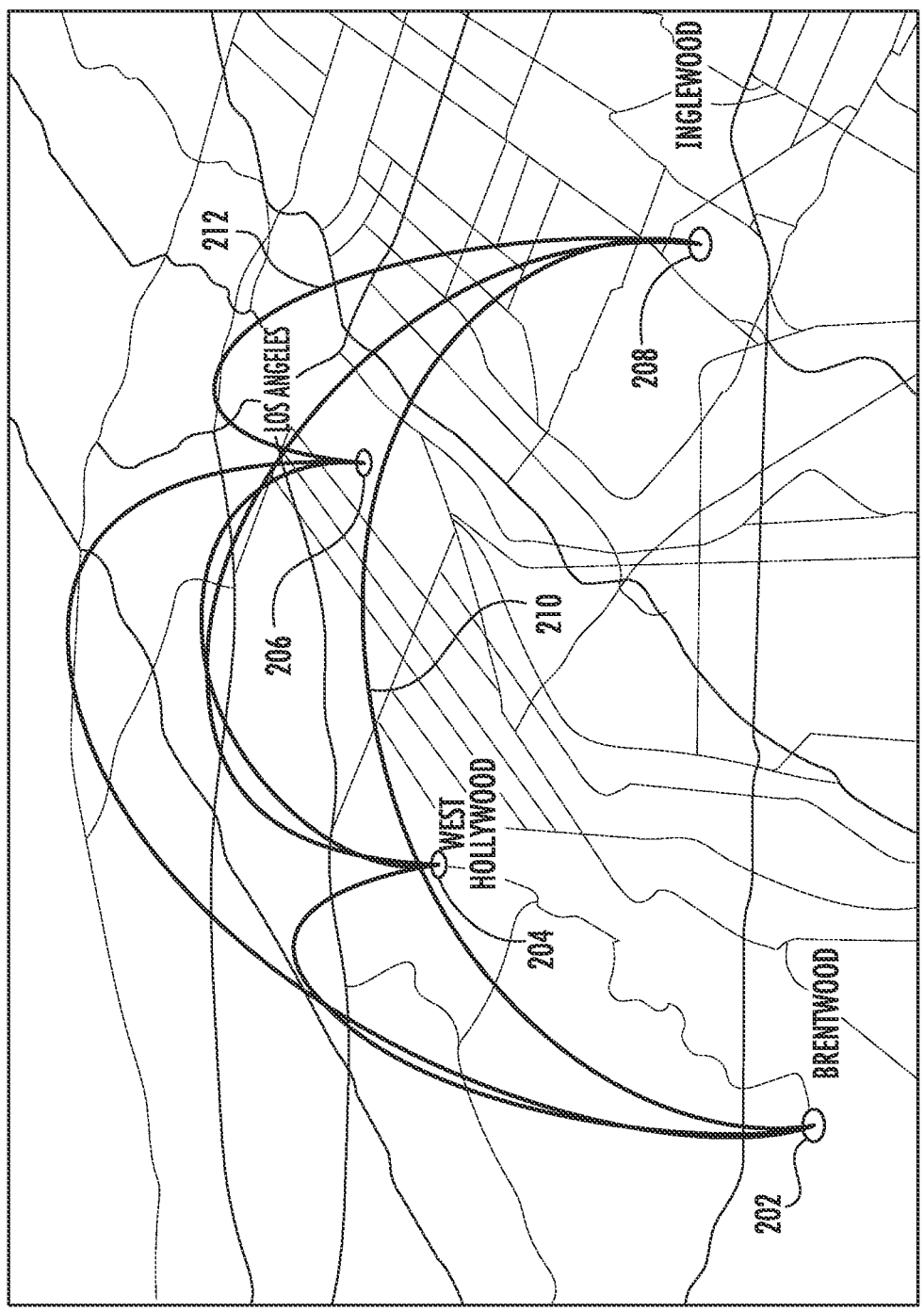
FIG. 2 depicts a graphical diagram of an example set of flight plans between an example set of transportation nodes according to example embodiments of the present disclosure.

FIG. 2 depicts a graphical diagram of an example set of flight plans between an example set of transportation nodes according to example embodiments of the present disclosure. In particular, FIG. 2 provides a simplified illustration of an example fixed infrastructure associated with flight-based transportation in an example metropolitan area. As illustrated in FIG. 2, there are four transportation nodes which may be referred to as "skyports." For example, a first transportation node 202 is located in a first neighborhood of the metropolitan area, a second transportation node 204 is located in a second neighborhood, a third transportation node 206 is located in a third neighborhood, and a fourth transportation node 208 is located in a fourth neighborhood. The location and number of transportation nodes is provided only as an example. Any number of transportation nodes at any different locations can be used.

Flights are available (e.g., may be pre-planned) between certain pairs of the transportation nodes. For example, a flight path 210 exists between the first transportation node 202 and the fourth transportation node 208. Likewise, a flight path 212 exists between the fourth transportation node 208 and the third transportation node 206.

Figure 3:
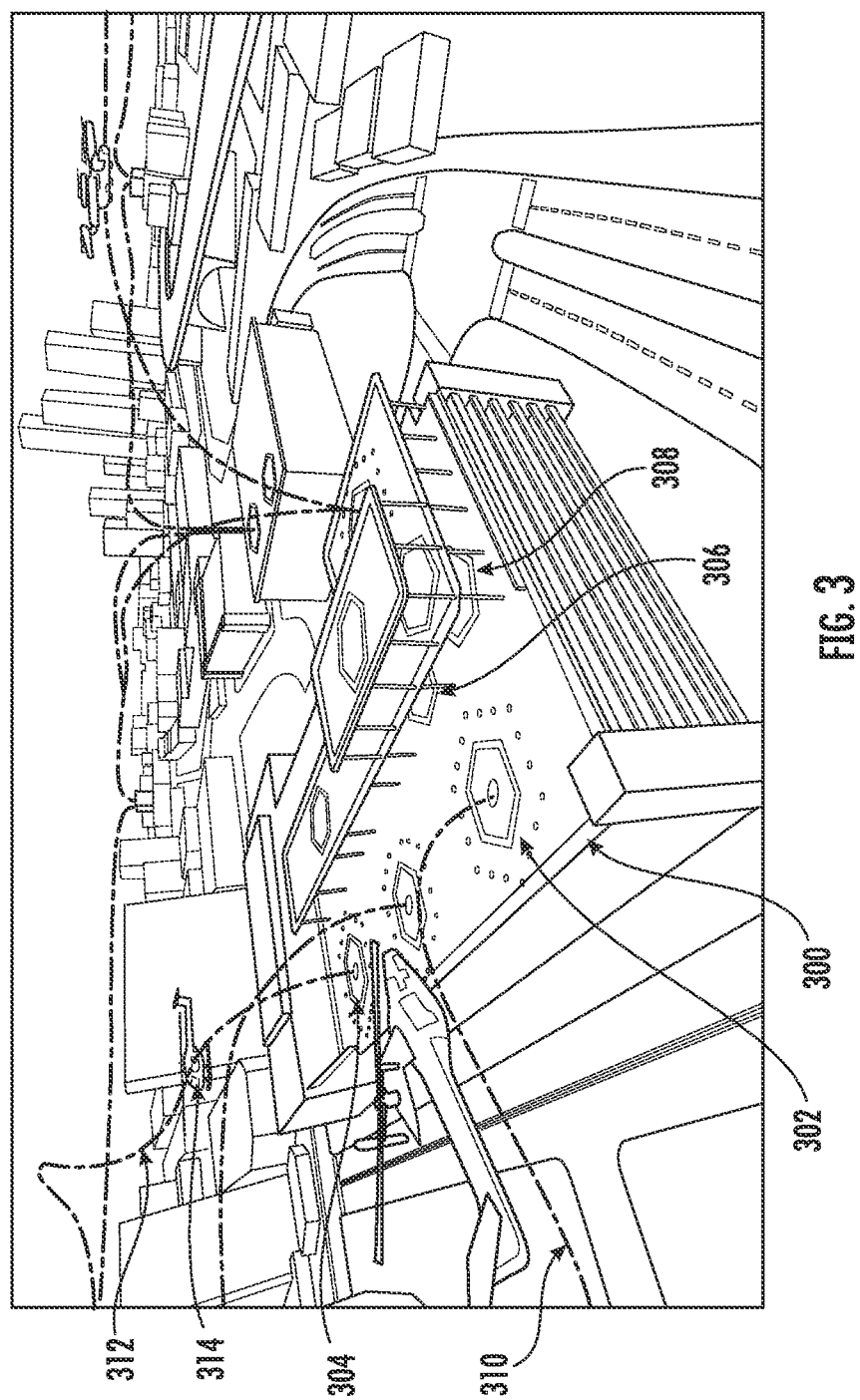
FIG. 3 depicts a graphical diagram of an example transportation node according to example embodiments of the present disclosure.

FIG. 3 depicts a graphical diagram of an example transportation node 300 according to example embodiments of the present disclosure. The example transportation node 300 includes a number of take-off/landing pads such as pads 302 and 304. The example transportation node 300 also includes a number of vehicle parking locations such as parking locations 306 and 308. For example, re-fueling or re-charging infrastructure may be accessible at each parking location.

Flight trajectories into and out of the transportation node 300 may be defined, configured, assigned, communicated, etc. FIG. 3 illustrates a number of flight trajectories including, for example, trajectories 310 and 312. The trajectories can be fixed or can be dynamically computed. The trajectories can be computed by the aircraft or can be centrally computed and then assigned and communicated to the aircraft. As one example, FIG. 3 illustrates a helicopter 314 taking off from the pad 304 according to the trajectory 312.

Example Multi-Modal Transportation Service

Figure 4:
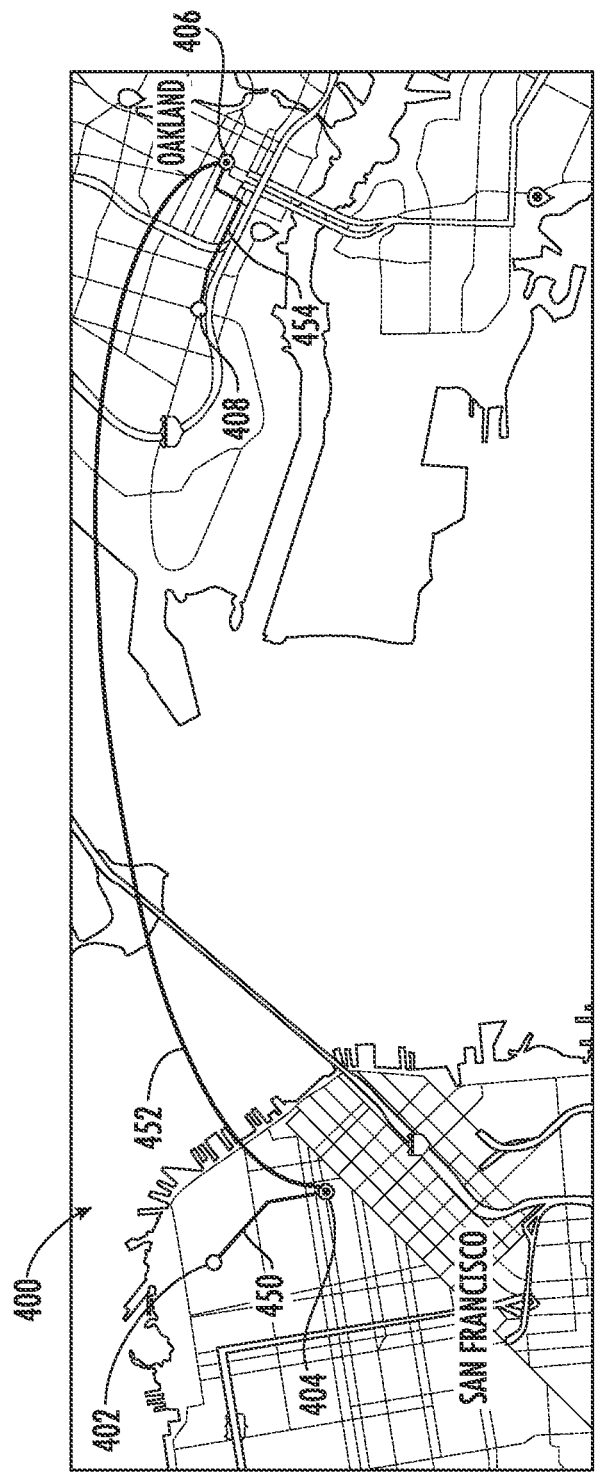
FIG. 4 depicts a graphical diagram of an example multi-modal transportation service itinerary according to example embodiments of the present disclosure.

FIG. 4 depicts a graphical diagram of an example multi-modal transportation service itinerary 400 according to example embodiments of the present disclosure. The itinerary 400 includes three transportation legs to transport the user from an origin 402 to a destination 408. In particular, the itinerary 400 includes a first, ground-based (e.g., car-based) transportation leg 450 which transports the user from the origin 402 to a departure transportation node 404; a second, flight-based transportation leg 452 which transports the user from the departure transportation node 404 to an arrival transportation node 406; and a third, ground-based (e.g., car-based) transportation leg 454 which transports the user from the arrival transportation node 406 to the destination 408.

Example Methods

Figure 5:
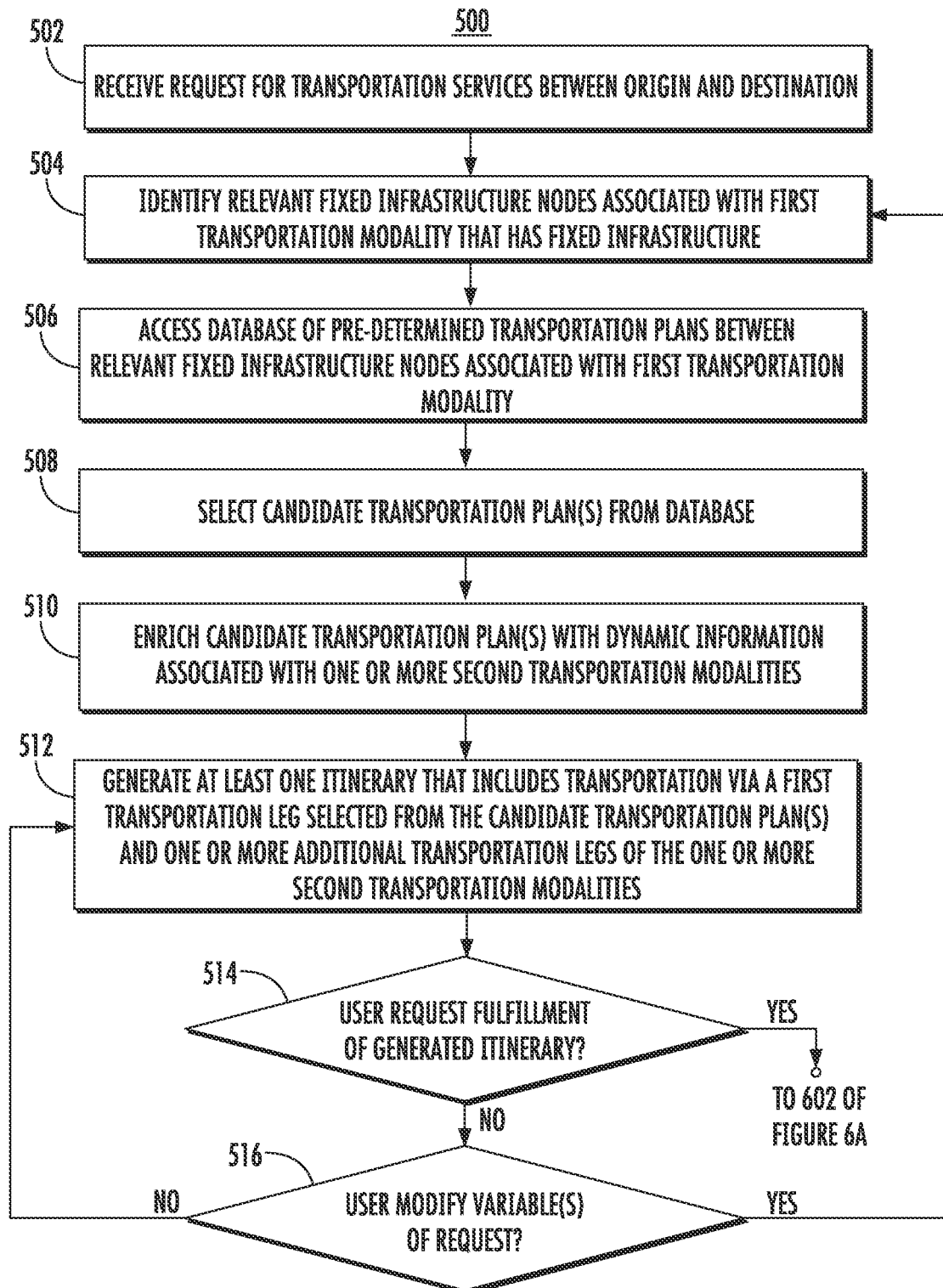
FIG. 5 depicts a flow chart diagram of an example method to plan a multi-modal transportation service itinerary according to example embodiments of the present disclosure.

FIG. 5 depicts a flow chart diagram of an example method 500 to plan a multi-modal transportation service itinerary according to example embodiments of the present disclosure.

At 502, a computing system can receive a request for transportation service between an origin and a destination.

At 504, the computing system can identify relevant fixed transportation nodes associated with a first transportation modality that has fixed infrastructure.

At 506, the computing system can access a database of pre-determined transportation plans between the relevant fixed transportation nodes associated with the first transportation modality.

At 508, the computing system can select one or more candidate transportation plans from the database.

At 510, the computing system can enrich the candidate transportations plans with dynamic information associated with one or more additional transportation legs via one or more second transportation modalities.

At 512, the computing system can generate at least one itinerary that includes transportation via a first transportation plan selected from the candidate transportation plans and one or more additional transportation legs of the one or more second transportation modalities.

At 514, the computing system can determine whether the user has requested fulfilment of the itinerary. If it is determined that the user has requested fulfilment of the itinerary, then method 500 can proceed to block 602 of FIG. 6. However, if it is determined that the user has not requested fulfilment of the itinerary, then method 500 can proceed to 516.

At 514, the computing system can determine whether the user has modified one or more variables of the request. If it is determined that the user has modified one or more variables of the request, then method 500 can return to block 504 and begin the itinerary construction process again. However, if it is determined that the user has not modified one or more variables of the request, then method 500 can return to block 512 and select an alternative itinerary for presentation to the user.

Figure 6A:
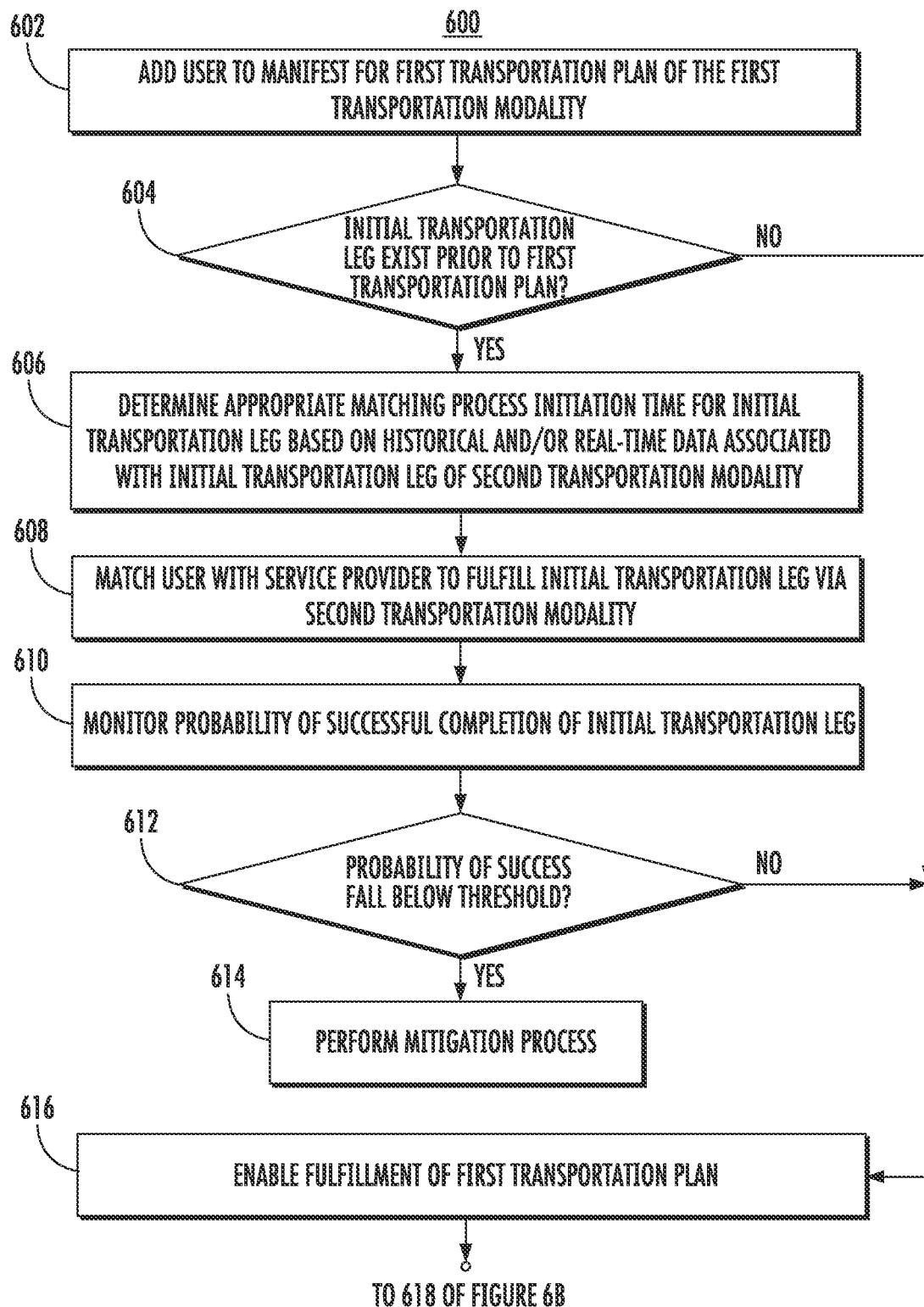
FIGS. 6A-B depict a flow chart diagram of an example method to fulfill a multi-modal transportation service itinerary according to example embodiments of the present disclosure.
Figure 6B:
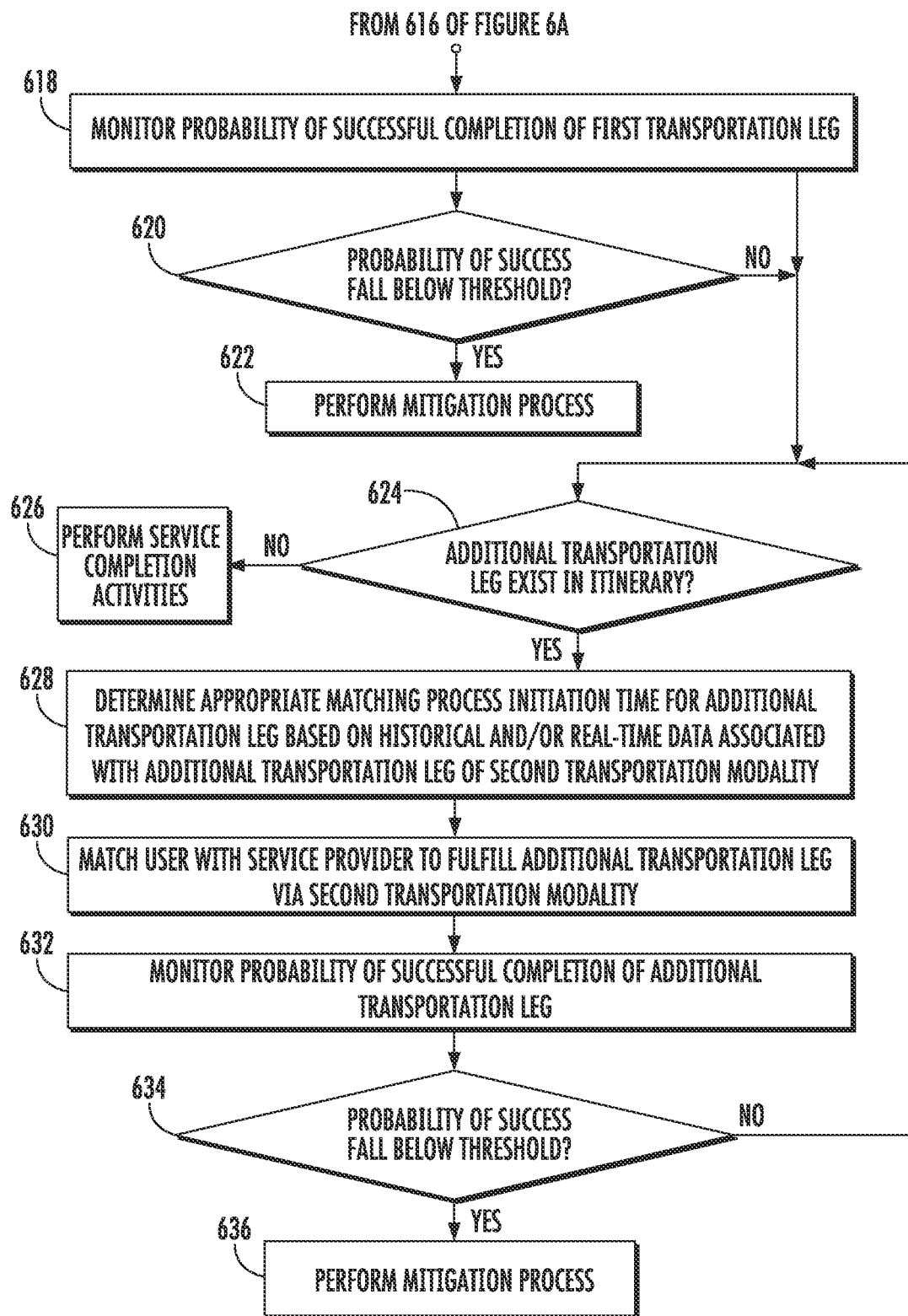

FIGS. 6A-B depict a flow chart diagram of an example method 600 to fulfill a multi-modal transportation service itinerary according to example embodiments of the present disclosure. Although the blocks of method 600 are shown in an example sequential order for simplicity of explanation, in some implementations, various blocks can be performed out of order and/or in parallel. For example, blocks 606, 608, 628, and 630 can be performed separately from and/or in parallel to various other blocks of method 600.

Referring first to FIG. 6A, at 602, a computing system can add a user to a manifest for a first transportation plan of a first transportation modality.

At 604, the computing system can determine whether an initial transportation leg exists prior to the first transportation plan. If it is determined that an initial transportation leg does not exist, then method 600 can proceed to block 616. However, if it is determined that an initial transportation leg does exist, then method 600 can proceed to 606.

At 606, the computing system can determine an appropriate matching process initiation time for the initial transportation leg based on historical and/or real-time data associated with the initial transportation leg of the second transportation modality.

At 608, the computing system can match the user with a service provider to fulfill the initial transportation leg via the second transportation modality.

At 610, the computing system can monitor a probability of successful completion of the initial transportation leg.

At 612, the computing system can determine whether the probability of success falls below a threshold. If it is determined that the probability of success has fallen below a threshold, then method 600 can proceed to block 614 and the computing system can perform a mitigation process.

However, if it is determined at 612 that the probability of success of the initial transportation leg has not fallen below a threshold, then method 600 can proceed to 616. At 616, the computing system can enable fulfillment of the first transportation plan. After block 616, method 600 proceeds to block 618 of FIG. 6B.

Referring now to FIG. 6B, at 618, the computing system can monitor a probability of successful completion of the first transportation leg.

At 620, the computing system can determine whether the probability of success falls below a threshold. If it is determined that the probability of success has fallen below a threshold, then method 600 can proceed to block 622 and the computing system can perform a mitigation process.

However, if it is determined at 620 that the probability of success of the initial transportation leg has not fallen below a threshold, then method 600 can proceed to 624.

At 624, the computing system can determine whether an additional transportation leg exists in the itinerary. If it is determined that an additional transportation leg does not exist, then method 600 can proceed to block 626. At 626, the computing system can perform service completion activities such as performing financial transactions, sending receipts, obtaining feedback from transportation service participants, etc.

However, if it is determined at 324 that an additional transportation leg does exist, then method 600 can proceed to 628.

At 628, the computing system can determine an appropriate matching process initiation time for the additional transportation leg based on historical and/or real-time data associated with the additional transportation leg of the second transportation modality.

At 630, the computing system can match the user with a service provider to fulfill the additional transportation leg via the second transportation modality.

At 632, the computing system can monitor a probability of successful completion of the additional transportation leg.

At 634, the computing system can determine whether the probability of success falls below a threshold. If it is determined that the probability of success has fallen below a threshold, then method 600 can proceed to block 636 and the computing system can perform a mitigation process.

However, if it is determined at 634 that the probability of success of the initial transportation leg has not fallen below a threshold, then method 600 can return to 624 and again assess whether an additional transportation leg exists in the itinerary.

Figure 7A:
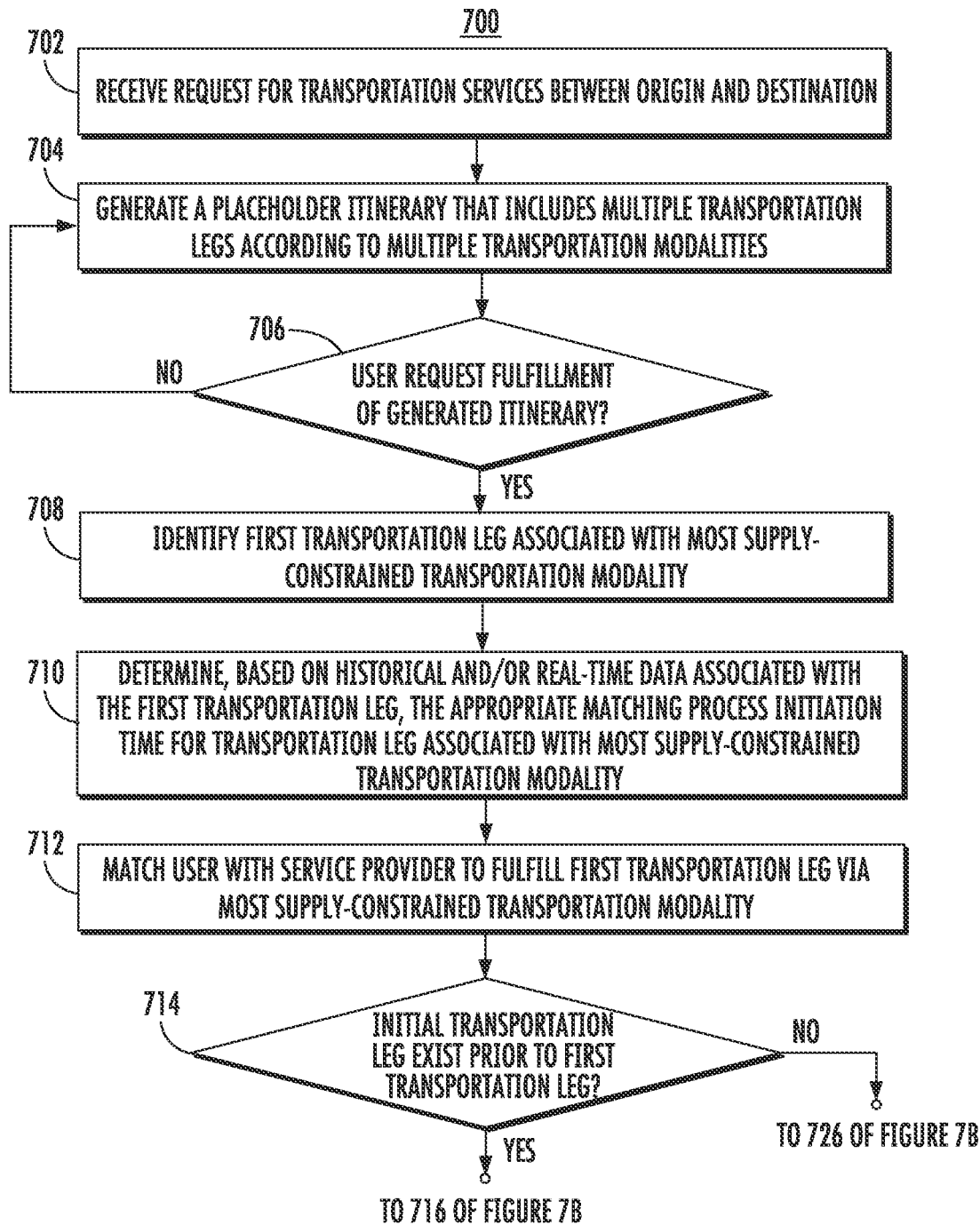
FIGS. 7A-C depict a flow chart diagram of an example method to plan and fulfill a multi-modal transportation service itinerary according to example embodiments of the present disclosure.
Figure 7B:
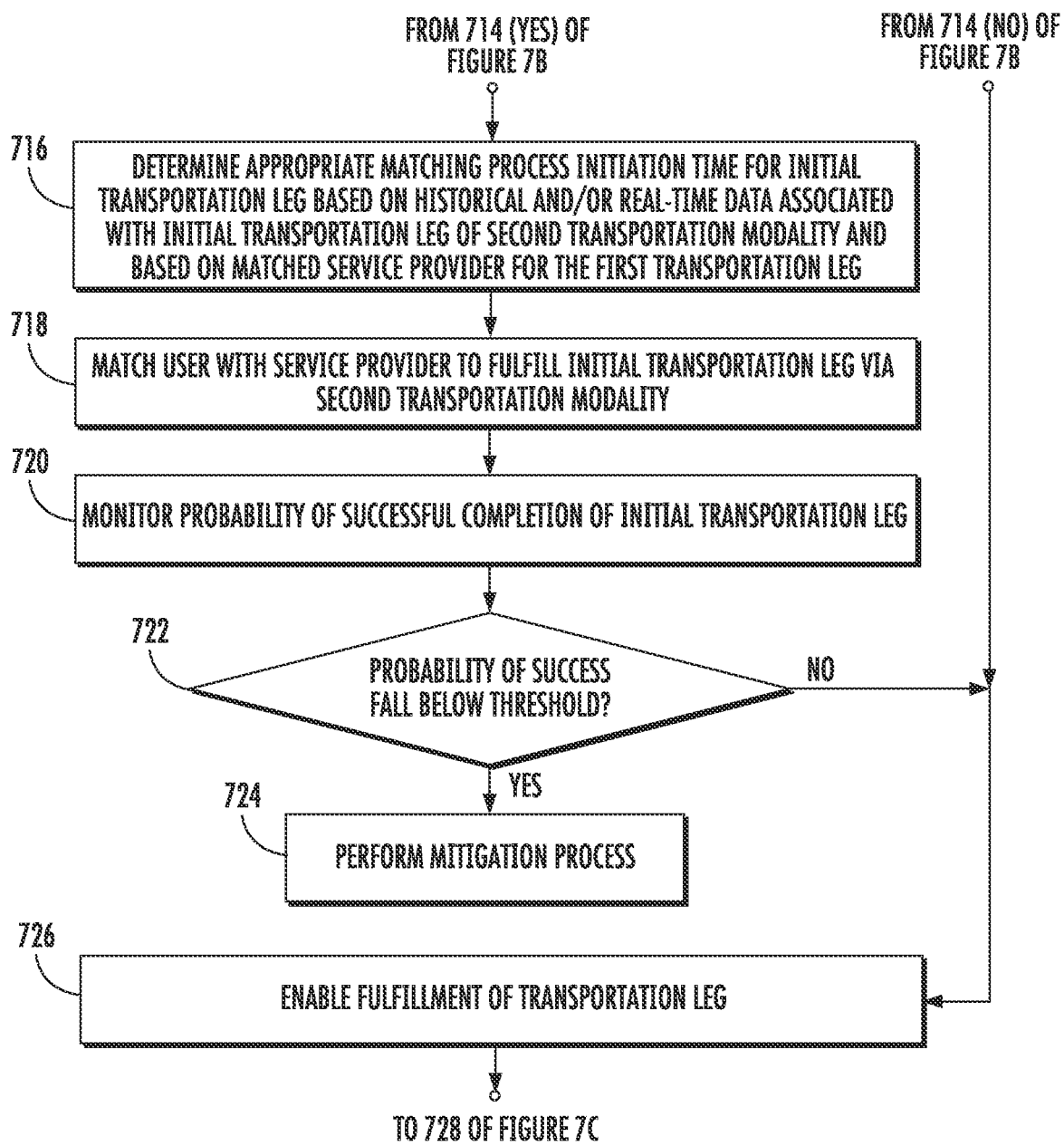
Figure 7C:
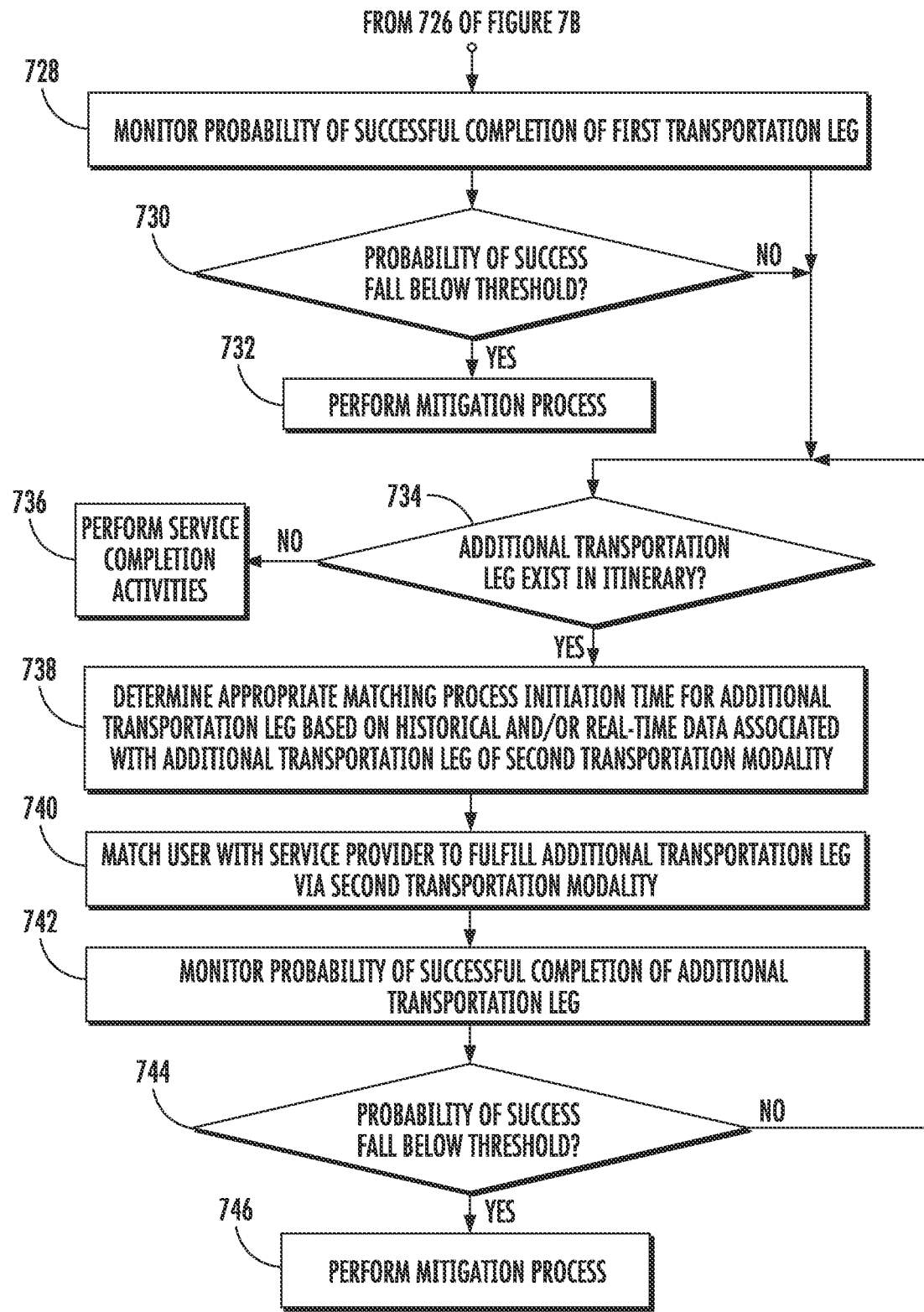

FIGS. 7A-C depict a flow chart diagram of an example method 700 to plan and fulfill a multi-modal transportation service itinerary according to example embodiments of the present disclosure. Although the blocks of method 700 are shown in an example sequential order for simplicity of explanation, in some implementations, various blocks can be performed out of order and/or in parallel. For example, blocks 710, 712, 716, 718, 738, and 740 can be performed separately from and/or in parallel to various other blocks of method 700.

Referring first to FIG. 7A, at 702, a computing system can receive a request for transportation service between an origin and a destination.

At 704, the computing system can generate a placeholder itinerary that includes multiple transportation legs according to multiple transportation modalities.

At 706, the computing system can determine whether the user has requested fulfilment of the itinerary. If it is determined that the user has requested fulfilment of the itinerary, then method 700 can proceed to block 708. However, if it is determined that the user has not requested fulfilment of the itinerary, then method 700 can return to 704 and generate an alternative placeholder itinerary for the user.

At 708, the computing system can identify a first transportation leg associated with the most-supply constrained transportation modality.

At 710, the computing system can determine an appropriate matching process initiation time for the transportation leg associated with the most supply-constrained transportation modality based on historical and/or real-time data associated with the transportation leg.

At 712, the computing system can match the user with a service provider to fulfill the transportation leg via the most supply-constrained transportation modality.

At 714, the computing system can determine whether an initial transportation leg exists prior to the first transportation leg. If it is determined that an initial transportation leg does not exist, then method 700 can proceed to block 726 of FIG. 7B. However, if it is determined that an initial transportation leg does exist, then method 700 can proceed to block 716 of FIG. 7B.

Referring now to FIG. 7B, at 716, the computing system can determine an appropriate matching process initiation time for the initial transportation leg based on historical and/or real-time data associated with the initial transportation leg of the second transportation modality and further based on the matched service provider for the first transportation leg (e.g., an expected variance in departure time provided by the matched service provider for the first transportation leg).

At 718, the computing system can match the user with a service provider to fulfill the initial transportation leg via the second transportation modality.

At 720, the computing system can monitor a probability of successful completion of the initial transportation leg.

At 722, the computing system can determine whether the probability of success falls below a threshold. If it is determined that the probability of success has fallen below a threshold, then method 700 can proceed to block 724 and the computing system can perform a mitigation process.

However, if it is determined at 722 that the probability of success of the initial transportation leg has not fallen below a threshold, then method 700 can proceed to 726. At 726, the computing system can enable fulfillment of the first transportation plan. After block 726, method 700 proceeds to block 728 of FIG. 7C.

Referring now to FIG. 7C, at 728, the computing system can monitor a probability of successful completion of the first transportation leg.

At 730, the computing system can determine whether the probability of success falls below a threshold. If it is determined that the probability of success has fallen below a threshold, then method 700 can proceed to block 732 and the computing system can perform a mitigation process.

However, if it is determined at 730 that the probability of success of the initial transportation leg has not fallen below a threshold, then method 700 can proceed to 734.

At 734, the computing system can determine whether an additional transportation leg exists in the itinerary. If it is determined that an additional transportation leg does not exist, then method 700 can proceed to block 736. At 736, the computing system can perform service completion activities such as performing financial transactions, sending receipts, obtaining feedback from transportation service participants, etc.

However, if it is determined at 734 that an additional transportation leg does exist, then method 700 can proceed to 738.

At 738, the computing system can determine an appropriate matching process initiation time for the additional transportation leg based on historical and/or real-time data associated with the additional transportation leg of the second transportation modality.

At 740, the computing system can match the user with a service provider to fulfill the additional transportation leg via the second transportation modality.

At 742, the computing system can monitor a probability of successful completion of the additional transportation leg.

At 744, the computing system can determine whether the probability of success falls below a threshold. If it is determined that the probability of success has fallen below a threshold, then method 700 can proceed to block 746 and the computing system can perform a mitigation process.

However, if it is determined at 744 that the probability of success of the initial transportation leg has not fallen below a threshold, then method 700 can return to 734 and again assess whether an additional transportation leg exists in the itinerary.

Additional Disclosure

The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 5, 6A-B, and 7A-C respectively depict steps performed in a particular order for purposes of illustration and discussion, the methods of the present disclosure are not limited to the particularly illustrated order or arrangement. The various steps of the methods 5, 6A-B, and 7A-C can be omitted, rearranged, combined, and/or adapted in various ways without deviating from the scope of the present disclosure.

Another example aspect of the present disclosure is directed to a computer-implemented method to plan and fulfill multi-modal transportation service itineraries. The method comprises: obtaining, by a computing system comprising one or more computing devices, data descriptive of an end-to-end itinerary for a user that describes transportation from an origin to a destination, the itinerary comprising a plurality of transportation legs that include transportation via a plurality of different transportation modalities; monitoring, by the computing system, progress of the user along each transportation leg of the itinerary; detecting, by the computing system, failure of one of the transportation legs of the itinerary; and performing, by the computing system, a mitigation process to mitigate the failure of the one of the transportation legs of the itinerary.

In some implementations, performing, by the computing system, the mitigation process comprises causing, by the computing system, a mitigation user interface to be provided to a human mitigation personnel, wherein the mitigation user interface enables the human mitigation personnel to modify one or more aspects of the itinerary.

In some implementations, the mitigation user interface one or both of: enables the human mitigation personnel to delay a pre-determined transportation plan associated with one of the transportation legs of the itinerary; and/or provides the human mitigation personnel with indicators that describe one or more impacts of one or more potential actions available to the human mitigation personnel within the mitigation user interface.

In some implementations, for at least one potential action, the indicators within the mitigation user interface are descriptive of: a number of users that will be impacted as a result of the potential action; a number of users that will miss their arrive by times as a result of the potential action; and/or an aggregate number of minutes that will be added to all users' transportation services as a result of the potential action.

In some implementations, performing, by the computing system, the mitigation process comprises: automatically generating, by the computing system, one or more contingency itineraries for the user; selecting, by the computing system, one of the contingency itineraries for the user; and communicating, by the computing system, with at least a user device to update the itinerary to the selected contingency itinerary.

In some implementations, selecting, by the computing system, one of the contingency itineraries for the user comprises ranking, by the computing system, the contingency itineraries based at least in part on: a number of users that will be impacted as a result of selection of each contingency itinerary; a number of users that will miss their arrive by times as a result of selection of each contingency itinerary; and/or an aggregate number of minutes that will be added to all users' transportation services as a result of selection of each contingency itinerary.

What is claimed is:

1. A computing system comprising:
one or more processors; and
one or more non-transitory computer-readable media that store instructions for execution by the one or more processors to cause the computing system to perform operations, the operations comprising:
   accessing a request to transport a user from an origin to a destination;
   computing one or more candidate end-to-end itineraries based at least in part on the origin and the destination, each candidate end-to-end itinerary comprising a plurality of transportation legs that include transportation via a plurality of different transportation modalities,
   wherein the plurality of transportation legs comprise at least a first transportation leg and a second transportation leg, the first transportation leg comprising ground-based transportation provided via one or more ground-based vehicles associated with a service provider of ground-based transportation and the second transportation leg comprising flight-based transportation provided via one or more aircraft associated with a service provider of flight-based transportation;
   scoring each of the one or more candidate end-to-end itineraries using an objective function that evaluates a cost associated with the plurality of transportation legs and a time associated with the plurality of transportation legs;
   computing a selected end-to-end itinerary for presentation to the user that has a best score based on the scoring using the objective function; and
   providing data indicative of the selected end-to-end itinerary to a user device.

2. The computing system of claim 1, wherein scoring each of the one or more candidate end-to-end itineraries using the objective function further evaluates at least one of a number of or a quality of contingency plans for providing alternative transportation legs associated with each candidate end-to-end itinerary.

3. The computing system of claim 1, wherein scoring each of the one or more candidate end-to-end itineraries using the objective function further evaluates at least one of a deviation of an estimated arrival time from a requested arrival time or a deviation of an estimated departure time from a requested departure time.

4. The computing system of claim 1, wherein scoring each of the one or more candidate end-to-end itineraries using the objective function further evaluates at least one of an uncertainty or a variance associated with respective transportation legs of each candidate end-to-end itinerary.

5. The computing system of claim 1, wherein providing the data indicative of the selected end-to-end itinerary to the user device comprises providing a single end-to-end price of fulfilling the selected end-to-end itinerary, the single end-to-end price corresponding to a sum of respective prices for the plurality of transportation legs.

6. The computing system of claim 1, the operations further comprising:
   receiving an indication from the user device indicative of a modified end-to-end itinerary comprising user modifications to one or more characteristics of the selected end-to-end itinerary; and
   providing updated data indicative of the modified end-to-end itinerary to the user device.

7. The computing system of claim 1, the operations further comprising:
   receiving an indication from the user device indicative of the user choosing to request fulfillment of the selected end-to-end itinerary; and
   initiating a request to one or more ride sharing networks to enable the user to complete the selected end-to-end itinerary.

8. The computing system of claim 1, the operations further comprising: in response to receiving the indication from the user device indicative of the user choosing to request fulfillment of the selected end-to-end itinerary, adding the user at a current time to a transportation plan of at least one of the first transportation leg or the second transportation leg.

9. The computing system of claim 1, wherein one or more of the plurality of transportation legs is a placeholder transportation plan that will be available at a future time for which the user is seeking to travel, the placeholder transportation plan being an estimation of a transportation service that will be available at the future time generated based on at least one of historical data or real-time data.

10. A computer-implemented method comprising:
    accessing a request to transport a user from an origin to a destination;
    computing one or more candidate end-to-end itineraries based at least in part on the origin and the destination, each candidate end-to-end itinerary comprising a plurality of transportation legs that include transportation via a plurality of different transportation modalities,
    wherein the plurality of transportation legs comprise at least a first transportation leg and a second transportation leg, the first transportation leg comprising ground-based transportation provided via one or more ground-based vehicles associated with a service provider of ground-based transportation and the second transportation leg comprising flight-based transportation provided via one or more aircraft associated with a service provider of flight-based transportation;
    scoring each of the one or more candidate end-to-end itineraries using an objective function that evaluates a cost associated with the plurality of transportation legs and a time associated with the plurality of transportation legs;
    computing a selected end-to-end itinerary for presentation to the user that has a best score based on the scoring using the objective function; and
    providing data indicative of the selected end-to-end itinerary to a user device.

11. The computer-implemented method of claim 10, wherein scoring each of the one or more candidate end-to-end itineraries using the objective function further evaluates at least one of a number of or a quality of contingency plans for providing alternative transportation legs associated with each candidate end-to-end itinerary.

12. The computer-implemented method of claim 10, wherein scoring each of the one or more candidate end-to-end itineraries using the objective function further evaluates at least one of a deviation of an estimated arrival time from a requested arrival time or a deviation of an estimated departure time from a requested departure time.

13. The computer-implemented method of claim 10, wherein scoring each of the one or more candidate end-to-end itineraries using the objective function further evaluates at least one of an uncertainty or a variance associated with respective transportation legs of each candidate end-to-end itinerary.

14. The computer-implemented method of claim 10, wherein providing the data indicative of the selected end-to-end itinerary to the user device comprises providing a single end-to-end price of fulfilling the selected end-to-end itinerary, the single end-to-end price corresponding to a sum of respective prices for the plurality of transportation legs.

15. The computer-implemented method of claim 10, further comprising:
   receiving an indication from the user device indicative of a modified end-to-end itinerary comprising user modifications to one or more characteristics of the selected end-to-end itinerary; and
   providing updated data indicative of the modified end-to-end itinerary to the user device.

16. The computer-implemented method of claim 10, further comprising:
   receiving an indication from the user device indicative of the user choosing to request fulfillment of the selected end-to-end itinerary; and
   initiating a request to one or more ride sharing networks to enable the user to complete the selected end-to-end itinerary.

17. The computer-implemented method of claim 10, wherein one or more of the plurality of transportation legs is a placeholder transportation plan that will be available at a future time for which the user is seeking to travel, the placeholder transportation plan being an estimation of a transportation service that will be available at the future time generated based on at least one of historical data or real-time data.

18. One or more non-transitory computer-readable media that store instructions for execution by one or more processors that cause the one or more processors to perform operations, the operations comprising:
   accessing a request to transport a user from an origin to a destination;
   computing one or more candidate end-to-end itineraries based at least in part on the origin and the destination, each candidate end-to-end itinerary comprising a plurality of transportation legs that include transportation via a plurality of different transportation modalities,
   wherein the plurality of transportation legs comprise at least a first transportation leg and a second transportation leg, the first transportation leg comprising ground-based transportation provided via one or more ground-based vehicles associated with a service provider of ground-based transportation and the second transportation leg comprising flight-based transportation provided via one or more aircraft associated with a service provider of flight-based transportation;
   scoring each of the one or more candidate end-to-end itineraries using an objective function that evaluates a cost associated with the plurality of transportation legs and a time associated with the plurality of transportation legs;
   computing a selected end-to-end itinerary for presentation to the user that has a best score based on the scoring using the objective function, and
   providing data indicative of the selected end-to-end itinerary to a user device.

19. The one or more non-transitory computer-readable media of claim 18, the operations further comprising:
   receiving an indication from the user device indicative of a modified end-to-end itinerary comprising user modifications to one or more characteristics of the selected end-to-end itinerary; and
   providing updated data indicative of the modified end-to-end itinerary to the user device.

20. The one or more non-transitory computer-readable media of claim 18, the operations further comprising:
   receiving an indication from the user device indicative of the user choosing to request fulfillment of the selected end-to-end itinerary; and
   initiating a request to one or more ride sharing networks to enable the user to complete the selected end-to-end itinerary.

* * * * *